US012323780B2

(12) United States Patent
Bharitkar

(10) Patent No.: US 12,323,780 B2
(45) Date of Patent: Jun. 3, 2025

(54) BAYESIAN OPTIMIZATION FOR SIMULTANEOUS DECONVOLUTION OF ROOM IMPULSE RESPONSES

(71) Applicant: SAMSUNG ELECTRONICS CO., LTD., Suwon-si (KR)

(72) Inventor: Sunil Bharitkar, Stevenson Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 18/054,059

(22) Filed: Nov. 9, 2022

(65) Prior Publication Data

US 2023/0353938 A1 Nov. 2, 2023

Related U.S. Application Data

(60) Provisional application No. 63/336,169, filed on Apr. 28, 2022.

(51) Int. Cl.
*H04R 3/04* (2006.01)
*H04R 29/00* (2006.01)
*H04S 7/00* (2006.01)

(52) U.S. Cl.
CPC ............. *H04R 3/04* (2013.01); *H04R 29/002* (2013.01); *H04S 7/301* (2013.01); *H04S 7/305* (2013.01)

(58) Field of Classification Search
CPC ......... H04R 3/04; H04R 29/002; H04S 7/301; H04S 7/305
See application file for complete search history.

(56) References Cited

U.S. PATENT DOCUMENTS

| | | | |
|---|---|---|---|
| 7,715,575 | B1 | 5/2010 | Sakurai et al. |
| 8,483,398 | B2 | 7/2013 | Fozunbal et al. |
| 9,602,923 | B2 | 3/2017 | Florencio et al. |
| 10,715,913 | B2 | 7/2020 | Iyer et al. |

(Continued)

OTHER PUBLICATIONS

Majdak, P., et al., "Multiple Exponential Sweep Method for Fast Measurement of Head-related Transfer Functions," J. Audio Eng. Soc., Jul./Aug. 2007, pp. 623-637, 55(7/8), United States.

(Continued)

*Primary Examiner* — Vivian C Chin
*Assistant Examiner* — Annabelle Kang
(74) *Attorney, Agent, or Firm* — Sherman IP LLP; Kenneth L. Sherman; Hemavathy Perumal

(57) ABSTRACT

One embodiment provides a method comprising optimizing one or more stimuli parameters by applying machine learning to training data. The method further comprises determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The method further comprises simultaneously exciting the plurality of speakers by providing the stimuli to the plurality of speakers at the same time for reproduction. The method further comprises simultaneously deconvolving the plurality of impulse responses based on the stimuli and one or more measurements of sound recorded during the reproduction and arriving at one or more microphones within the spatial area.

20 Claims, 31 Drawing Sheets

(56) References Cited

U.S. PATENT DOCUMENTS

| | | | | |
|---|---|---|---|---|
| 2002/0054685 | A1 | 5/2002 | Avendano et al. | |
| 2015/0230041 | A1 * | 8/2015 | Fejzo | H04S 7/303 381/303 |
| 2016/0269828 | A1 | 9/2016 | Smith et al. | |
| 2017/0094421 | A1 * | 3/2017 | Giri | H04R 25/407 |
| 2019/0320275 | A1 * | 10/2019 | Audfray | H04S 7/301 |

OTHER PUBLICATIONS

Bharitkar, S., "Deconvolution of room impulse responses from simultaneous excitation of loudspeakers," In Audio Engineering Society Convention 151, Oct. 13, 2021, pp. 1-9, United States.

Wen, J. Y.C. et al., "Evaluation of Speech Dereverberation Algorithms Using the Mardy Database", IWAENC 2006, Sep. 12, 2006, pp. 1-4, Paris.

* cited by examiner

490

491

BAYESIAN OPTIMIZATION FOR SIMULTANEOUS DECONVOLUTION OF ROOM IMPULSE RESPONSES

CROSS-REFERENCE TO RELATED APPLICATIONS

The present application claims priority to U.S. Provisional Patent Application No. 63/336,169, filed on Apr. 28, 2022, incorporated by reference in its entirety.

TECHNICAL FIELD

One or more embodiments generally relate to loudspeaker-room equalization, in particular, loudspeaker-room equalization with Bayesian optimization for simultaneous deconvolution of loudspeaker-room impulse responses.

BACKGROUND

Loudspeaker-room equalization is essential for creating high-quality spatial and immersive audio for consumer home-theater (e.g., soundbar speakers, television (TV) speakers, home theater in a box (HTIB) speakers, etc.) and large environments (movie theaters, live venues, etc.). Loudspeaker-room equalization involves performing an in-situ, or in-room, measurement by exciting one or more loudspeakers within a room with an excitation signal (i.e., stimuli), estimating loudspeaker-room impulse responses based on the measurement, and designing equalization filters for each loudspeaker based on the impulse responses. The excitation signal may be programmed in a digital signal processing (DSP) or central processing unit (CPU) of an electronic device. Alternatively, the excitation signal may be retrieved from a remote server or a client before being delivered to the loudspeakers. Examples of a stimuli include, but are not limited to, Maximum Length Sequence (MLS), log-sweep, multi-tone, or shaped stimuli (e.g., pink-noise).

SUMMARY

One embodiment provides a method comprising optimizing one or more stimuli parameters by applying machine learning to training data. The method further comprises determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The method further comprises simultaneously exciting the plurality of speakers by providing the stimuli to the plurality of speakers at the same time for reproduction. The method further comprises simultaneously deconvolving the plurality of impulse responses based on the stimuli and one or more measurements of sound recorded during the reproduction and arriving at one or more microphones within the spatial area.

Another embodiment provides a system comprising at least one processor and a non-transitory processor-readable memory device storing instructions that when executed by the at least one processor causes the at least one processor to perform operations. The operations include optimizing one or more stimuli parameters by applying machine learning to training data. The operations further include determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The operations further include simultaneously exciting the plurality of speakers by providing the stimuli to the plurality of speakers at the same time for reproduction. The operations further include simultaneously deconvolving the plurality of impulse responses based on the stimuli and one or more measurements of sound recorded during the reproduction and arriving at one or more microphones within the spatial area.

One embodiment provides a non-transitory processor-readable medium that includes a program that when executed by a processor performs a method comprising optimizing one or more stimuli parameters by applying machine learning to training data. The method further comprises determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The method further comprises simultaneously exciting the plurality of speakers by providing the stimuli to the plurality of speakers at the same time for reproduction. The method further comprises simultaneously deconvolving the plurality of impulse responses based on the stimuli and one or more measurements of sound recorded during the reproduction and arriving at one or more microphones within the spatial area.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
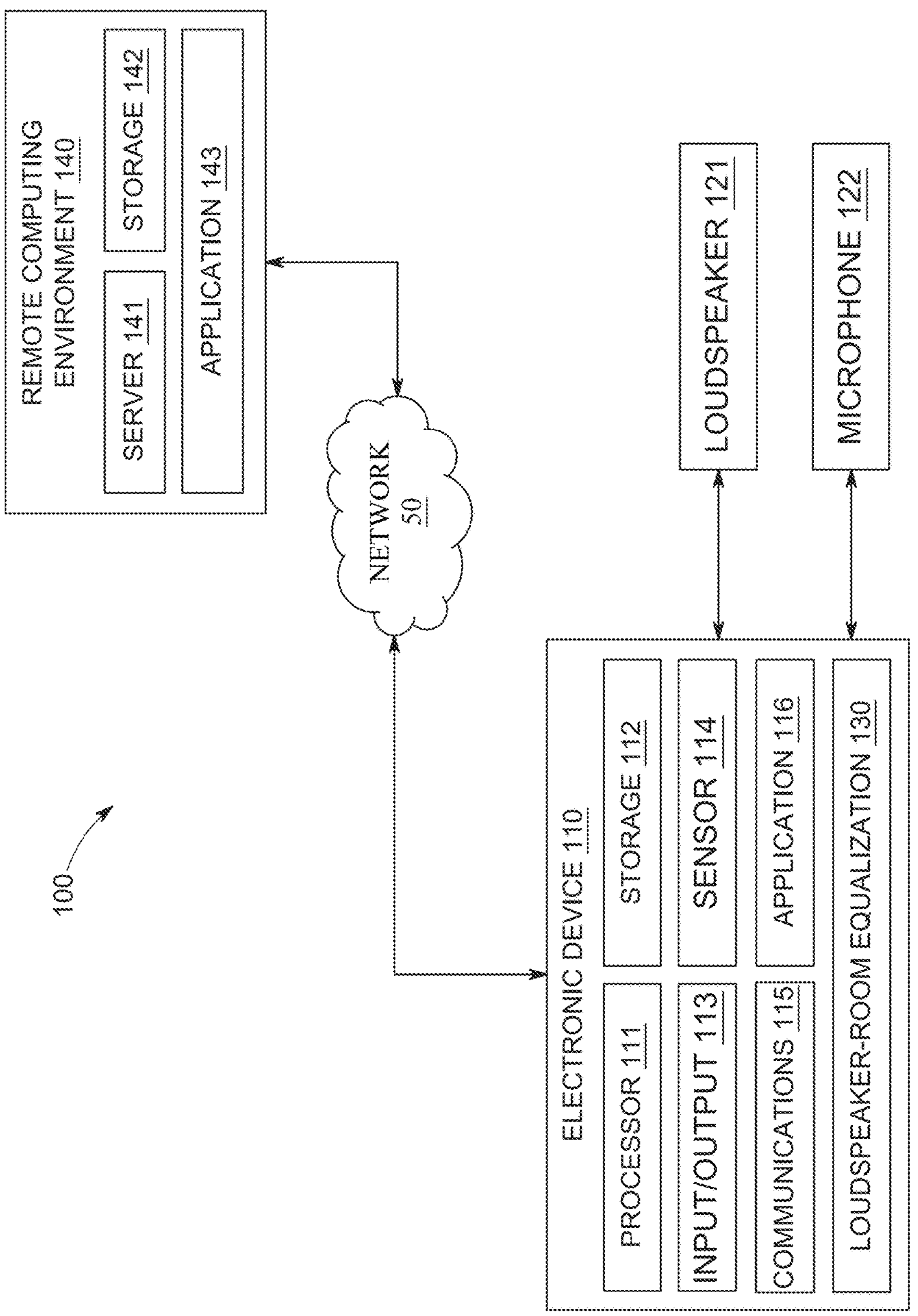
FIG. 1 is an example computing architecture for implementing loudspeaker-room equalization with Bayesian optimization for simultaneous deconvolution of loudspeaker-room impulse responses, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to loudspeaker-room equalization, in particular, loudspeaker-room equalization with Bayesian optimization for simultaneous deconvolution of loudspeaker-room impulse responses. One embodiment provides a method comprising optimizing one or more stimuli parameters by applying machine learning to training data. The method further comprises determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The method further comprises simultaneously exciting the plurality of speakers by providing the stimuli to the plurality of speakers at the same time for reproduction. The method further comprises simultaneously deconvolving the plurality of impulse responses based on the stimuli and one or more measurements of sound recorded during the reproduction and arriving at one or more microphones within the spatial area.

Another embodiment provides a system comprising at least one processor and a non-transitory processor-readable memory device storing instructions that when executed by the at least one processor causes the at least one processor to perform operations. The operations include optimizing one or more stimuli parameters by applying machine learning to training data. The operations further include determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The operations further include simultaneously exciting the plurality of speakers by providing the stimuli to the plurality of speakers at the same time for reproduction. The operations further include simultaneously deconvolving the plurality of impulse responses based on the stimuli and one or more measurements of sound recorded during the reproduction and arriving at one or more microphones within the spatial area.

One embodiment provides a non-transitory processor-readable medium that includes a program that when executed by a processor performs a method comprising optimizing one or more stimuli parameters by applying machine learning to training data. The method further comprises determining, based on the one or more optimized stimuli parameters, stimuli for simultaneously exciting a plurality of speakers within a spatial area. The stimuli has a shortest possible duration that is accurate for simultaneous deconvolution of a plurality of impulse responses of the plurality of speakers. The method further comprises simultaneously exciting the plurality of speakers by providing the stimuli to the plurality of speakers at the same time for reproduction. The method further comprises simultaneously deconvolving the plurality of impulse responses based on the stimuli and one or more measurements of sound recorded during the reproduction and arriving at one or more microphones within the spatial area.

For expository purposes, the terms "speakers" and "loudspeakers" are used interchangeably in this specification.

For expository purposes, the terms "loudspeaker-room impulse responses" and "impulse responses" are used interchangeably in this specification.

Conventional approaches for loudspeaker-room equalization involve sequentially exciting one loudspeaker within a room one at a time with a stimulus signal, sequentially measuring a loudspeaker-room impulse response of each loudspeaker within the room using one or more in-situ, or in-room, microphones (i.e., measurement microphones), and deconvolving each impulse response of each loudspeaker within the room based on a measurement. Each microphone has a microphone position representing a position of the microphone within the room.

A stimulus signal may be deterministic (e.g., pink-noise, logarithmic sweep (log-sweep), multi-tone, or maximum length sequences (MLS)) or stochastic (e.g., white-noise). A loudspeaker-room impulse response may be represented as an impulse response (depicting direct sound, early reflections, and late reflections or reverberations) that includes information indicative of a time-delay for direct sound to arrive at a measurement microphone. A loudspeaker-room impulse response may also be represented as a magnitude response (in the frequency domain).

For expository purposes, the terms “listening position” and “microphone position” are used interchangeably in this specification.

Typically, repeated measurements, and averaging, per loudspeaker, are done per listening position (i.e., multiple listening positions spatial averaging) to obtain a high signal-to-noise ratio (SNR) in an impulse response. With these conventional approaches, as a number of loudspeakers and positions of the loudspeakers increase, in addition to repeated measurements for averaging, the amount of time required to measure loudspeaker-room impulse responses (i.e., measurement time) will increase significantly based on a length of the stimulus signal. The length of the stimulus signal and the measurement time (when there is silence and no stimulus is present) is a function of an amount of low-frequency reverberation that needs to be captured for high resolution analysis in the low-frequency region of human hearing. In consumer environments involving consumer electronic devices, typical measurement and deconvolution time per loudspeaker, per listening position can be at least as long as 5 seconds, whereas in professional venues such as movie theaters and live venues, typical measurement time per loudspeaker may be significantly increased by a factor of 3 or higher. For example, with a 7.1.4 loudspeaker setup and 10 averages per listening position, the measurement time may be at least as long as 600 seconds (10 minutes) per listening position. Even without averaging, measurement time per listening position may be as long as a minute in a consumer environment. This tradeoff in time with equalization also impacts any factory calibration of soundbar speakers. Measurement time and calibration time is further increased in professional venues (e.g., movie theaters) due to use of larger loudspeaker arrays.

One or more embodiments provide a method and system of Bayesian optimization for simultaneous deconvolution of loudspeaker-room impulse responses. Specifically, all loudspeakers within a room (or another space) are simultaneously excited with a short-duration stimuli having one or more parameters (“stimuli parameters”) optimized a-priori via Bayesian optimization, and loudspeaker-room impulse responses (i.e., magnitude and phase) of all the loudspeakers are simultaneously extracted from one or more measurements (i.e., recordings) recorded via one or more measurement microphones. The impulse responses are measured at one or more microphone positions (of the one or more measurement microphones) simultaneously (i.e., in parallel). The Bayesian optimization involves applying machine learning to training data to determine the one or more optimized stimuli parameters. In one embodiment, the one or more optimized stimuli parameters results in a shortest possible duration for the stimuli that is accurate for the simultaneous deconvolution of the impulse responses.

In one embodiment, the training data comprises a larger number of loudspeaker-room impulse responses to obtain a short-duration stimulus. In one embodiment, the training data includes loudspeaker-room impulse responses from the Multichannel Acoustic Reverberation Dataset at York (MARDY).

The loudspeakers within the room may include, but are not limited to, television (TV) speakers, discrete home theater in a box (HTIB) speakers, soundbar speakers, etc. The measurements comprise a capture of signals emanating at the same time from all the loudspeakers. By simultaneously exciting all the loudspeakers at the same time, significant measurement time is avoided, thereby saving time and providing a low barrier for use in consumer environments. Additionally, simultaneously exciting the loudspeakers with the short-duration stimuli having the one or more optimized stimuli parameters further reduces measurement time and increases a time-improvement factor.

In one embodiment, excitation signals (i.e., the short-duration stimuli) may be generated by a distributed digital signal processing (DSP) or central processing unit (CPU) of the loudspeakers, a centralized DSP/CPU of an electronic device (e.g., TV, soundbar, HTIB), a centralized DSP of a loudspeaker, or retrieved from a local/remote server before being delivered to the loudspeakers at the same time for reproduction.

In one embodiment, a simultaneous extraction routine for simultaneously extracting the loudspeaker-room impulse responses may be programmed on the distributed DSP/CPU of the loudspeakers, the centralized DSP/CPU of the electronic device (e.g., TV, soundbar, HTIB), the centralized DSP of a loudspeaker, a CPU of a mobile device (e.g., a smart phone) separate from the electronic device, or on the local/remote server.

In one embodiment, the measurement microphones may be on individual loudspeakers distributed within the room, included with the electronic device (e.g., TV, soundbar, HTIB), or included in the mobile device (e.g., a smart phone). For example, a mobile application executing or operating on the mobile device invokes a measurement microphone of the mobile device to record at a microphone position of the measurement microphone and send a measurement (i.e., recording) to a local DSP/CPU of the mobile device or to a remote server via Wi-Fi.

In one embodiment, the loudspeaker-room impulse responses may be estimated by the DSP of the electronic device (e.g., TV, soundbar, HTIB) or on the remote server, and equalization filters designed for each loudspeaker may be immediately programmed on a DSP of the loudspeaker.

FIG. 1 is an example computing architecture 100 for implementing loudspeaker-room equalization with Bayesian optimization for simultaneous deconvolution of loudspeaker-room impulse responses, in one or more embodiments. The computing architecture 100 comprises an electronic device 110 including computing resources, such as one or more processor units 111 and one or more storage units 112. One or more applications may execute/operate on the electronic device 110 utilizing the computing resources of the electronic device 110.

Examples of an electronic device 110 include, but are not limited to, a television (TV), an audio or sound system (e.g., a soundbar, a HTIB, etc.), a smart appliance (e.g., a smart TV, etc.), a mobile electronic device (e.g., a smart phone, a laptop, a tablet, etc.), a wearable device (e.g., a smart watch, a smart band, a head-mounted display, smart glasses, etc.), a receiver, a gaming console, a video camera, a media playback device (e.g., a DVD player), a set-top box, an Internet of Things (IoT) device, a cable box, a satellite receiver, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, the electronic device 110 comprises one or more sensor units 114 integrated in or coupled to the electronic device 110. In one embodiment, the one or more other sensor units 114 include, but are not limited to, a camera, a GPS, a motion sensor, etc.

In one embodiment, the computing architecture 100 comprises one or more in-situ, or in-room, loudspeakers 121 configured to reproduce audio/sounds. The one or more loudspeakers 121 are physically located/positioned within a spatial area, such as a room or another space (e.g., inside a vehicle). In one embodiment, the one or more loudspeakers 121 are integrated in the electronic device 110 (i.e., built-in loudspeakers). In another embodiment, the one or more loudspeakers 121 are connected to the electronic device 110 (e.g., via a wired or wireless connection).

In one embodiment, the computing architecture 100 comprises one or more in-situ, or in-room, microphones (i.e., measurement microphones) 122 configured to record audio/sounds. The one or more microphones 122 are physically located/positioned within the same spatial area (e.g., same room or same other space) as the one or more loudspeakers 121. In one embodiment, the one or more microphones 122 may be on the one or more loudspeakers 121, included with the electronic device 110 (i.e., built-in microphones), or included in a mobile device (e.g., a smart phone). In one embodiment, the one or more microphones 122 are connected to the electronic device 110 (e.g., via a wired or wireless connection). Each microphone 122 provides an audio channel.

In one embodiment, the one or more applications on the electronic device 110 include a loudspeaker-room equalization system 130 that provides measurement and loudspeaker-room equalization/calibration utilizing the one or more loudspeakers 121 and the one or more microphones 122. The loudspeaker-room equalization system 130 is configured for: (1) simultaneously exciting all the loudspeakers 121 within the room (or another space, such as inside a vehicle) with a short-duration stimuli (or a combination of stimuli), wherein the stimuli has one or more stimuli parameters optimized a-priori using Bayesian optimization, and (2) simultaneously extracting loudspeaker-room impulse responses (i.e., magnitude and phase) of all the loudspeakers 121 from one or more measurements (i.e., recordings) recorded via the one or more microphones 122. The impulse responses of all the loudspeakers 121 are measured at one or more microphone positions of the one or more microphones 122 simultaneously (i.e., in parallel). The loudspeaker-room equalization system 130 performs simultaneous deconvolution of the impulse responses by applying one or more linearly-optimal algorithms/techniques.

Unlike conventional approaches that involve sequential measurements of loudspeaker-room impulse responses, the loudspeaker-room equalization system 130 automatically determines all the loudspeaker-room impulse responses in a single step, thereby significantly saving measurement time while giving accurate estimates of the impulse responses. In one embodiment, the loudspeaker-room equalization system 130 provides equalization/calibration of all the loudspeakers 121 within the room (or another space). The impulse responses may be used to create high-quality immersive spatial audio experiences on TVs, soundbars, and mobile devices.

In one embodiment, the one or more applications on the electronic device 110 may further include one or more software mobile applications 116 loaded onto or downloaded to the electronic device 110, such as an audio streaming application, a video streaming application, etc. A software mobile application 116 on the electronic device 110 may exchange data with the loudspeaker-room equalization system 130.

In one embodiment, the electronic device 110 comprises a communications unit 115 configured to exchange data with a remote computing environment, such as a remote computing environment 140 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 140 includes computing resources, such as one or more servers 141 and one or more storage units 142. One or more applications 143 that provide higher-level services may execute/operate on the remote computing environment 140 utilizing the computing resources of the remote computing environment 140.

In one embodiment, the remote computing environment 140 provides an online platform for hosting one or more online services (e.g., an audio streaming service, a video streaming service, etc.) and/or distributing one or more applications. For example, the loudspeaker-room equalization system 130 may be loaded onto or downloaded to the electronic device 110 from the remote computing environment 140 that maintains and distributes updates for the system 130. As another example, a remote computing environment 140 may comprise a cloud computing environment providing shared pools of configurable computing system resources and higher-level services.

In one embodiment, the loudspeaker-room equalization system 130 is integrated into, or implemented as part of, a consumer home-theater environment, such as a TV, a soundbar, or a HTIB. In one embodiment, the loudspeaker-room equalization system 200 (FIG. 2) may be used for in-situ, or factory, measurement and equalization of all speakers within the environment simultaneously in a very short time.

In one embodiment, the loudspeaker-room equalization system 130 is integrated into, or implemented as part of, a professional venue, such as a cinema, a movie theatre, or a live venue. In one embodiment, the loudspeaker-room equalization system 200 may be used for measuring and calibrating all speakers within the professional venue in a very short time.

In one embodiment, the loudspeaker-room equalization system 130 is integrated into, or implemented as part of, an automotive receiver of a vehicle, such as a car. In one embodiment, the loudspeaker-room equalization system 200 may be used for measuring and tuning automotive acoustics very fast by exciting all loudspeakers within the vehicle at the same time.

In one embodiment, the loudspeaker-room equalization system 200 may be used for measuring head-related transfer functions, include measuring human ear responses at various angles of multiple speakers arranged in a hemispherical arrangement. These responses may be used to create high-quality immersive spatial audio experiences on TVs, soundbars, and mobile devices.

In one embodiment, the loudspeaker-room equalization system 200 may be readily adapted to work on local devices (e.g., DSP with microphones in TVs or soundbars, or with smart phones and its mobile apps) or on a cloud (e.g., with smart phones, its mobile apps, and Wi-Fi connected speakers).

Figure 2:
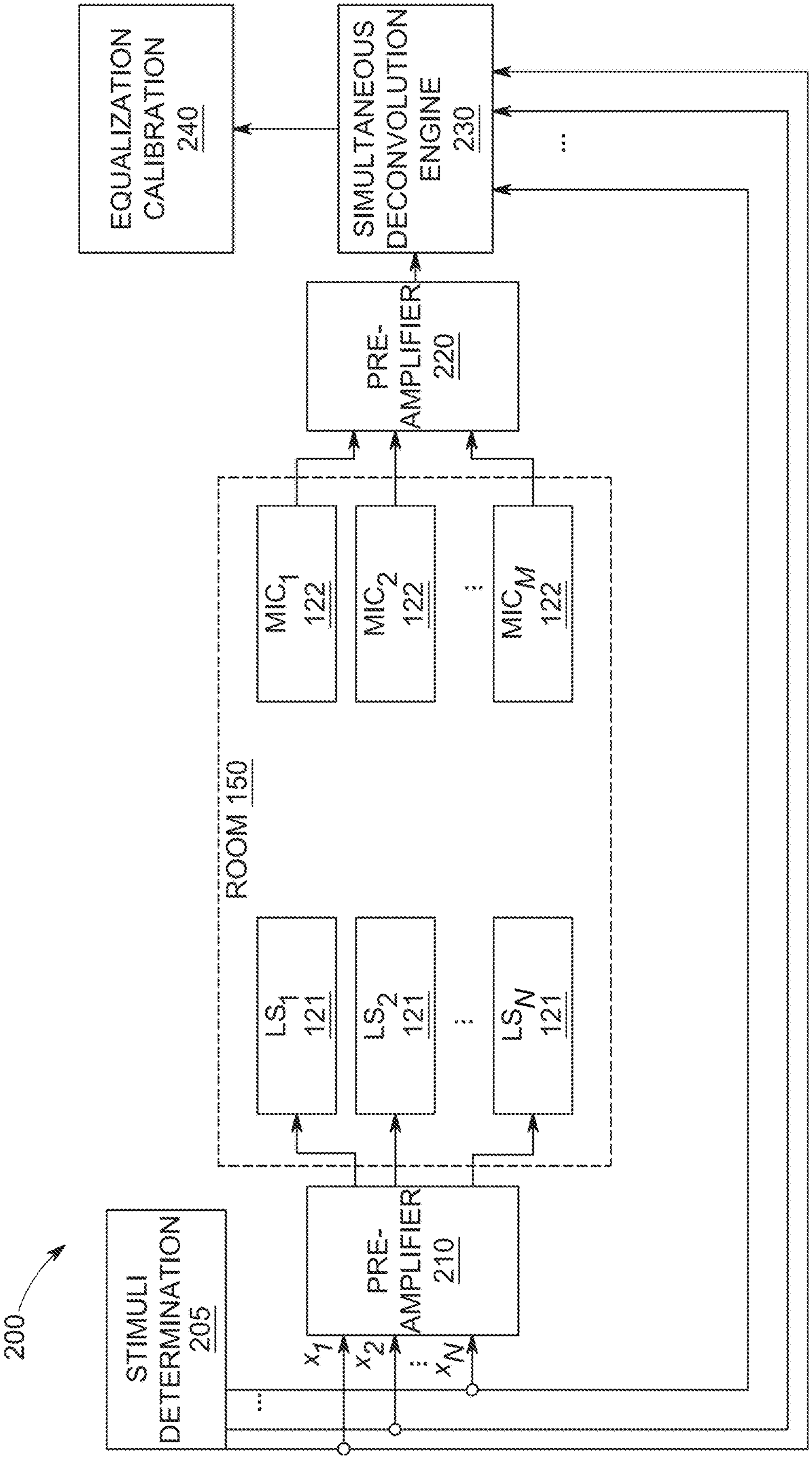
FIG. 2 illustrates an example loudspeaker-room equalization system for simultaneous excitation of all loudspeakers, in one or more embodiments.

FIG. 2 illustrates an example loudspeaker-room equalization system 200 for simultaneous excitation of all loudspeakers, in one or more embodiments. In one embodiment, the loudspeaker-room equalization system 130 in FIG. 1 is implemented as the loudspeaker-room equalization system 200. Let N generally denote a number of in-situ, or in-room, loudspeakers 121, wherein N is a positive integer. The N loudspeakers include a first loudspeaker $LS_1$, a second loudspeaker $LS_2$, . . . , and a $N^{th}$ loudspeaker $LS_N$. The N loudspeakers provide N loudspeaker channels (each loudspeaker 121 provides a loudspeaker channel).

Let M generally denote a number of in-situ, or in-room, microphones (i.e., measurement microphones) 122, wherein M is a positive integer. The M microphones include a first microphone $MIC_1$, a second microphone $MIC_2$, . . . , and a $M^{th}$ microphone $MIC_P$. The N loudspeakers and the M microphones are physically located/positioned within a room 150 (or another space, such as inside a vehicle).

Let i generally denote a loudspeaker/loudspeaker channel of the N loudspeakers/loudspeaker channels, wherein $i \in [1, N]$. Let $x_i$ generally denote an excitation/stimulus signal delivered to loudspeaker i for reproduction. Let $h_{i,j}(n)$ generally denote a true (i.e., actual) loudspeaker-room impulse response ("true impulse response") of loudspeaker i measured at a location of microphone j within the room 150, wherein $j \in [1, M]$, and $h_{i,j}(n) \leftrightarrow H_{i,j}(e^{j\omega})$.

In one embodiment, the loudspeaker-room equalization system 200 comprises a stimuli determination unit 205 configured to: (1) optimize one or more stimuli parameters using Bayesian optimization, and (2) generate short-duration stimuli (or a combination of stimuli) for simultaneously exciting all the N loudspeakers based on the one or more optimized stimuli parameters. In one embodiment, the one or more optimized stimuli parameters are used to generate the short-duration stimuli with a shortest possible duration that is accurate for simultaneous deconvolution of loudspeaker-room impulse responses.

The Bayesian optimization involves applying machine learning to training data to determine the one or more optimized stimuli parameters. In one embodiment, the training data comprises a large number of loudspeaker-room impulse responses towards short-duration stimuli. For example, in one embodiment, the training data includes loudspeaker-room impulse responses from MARDY.

In one embodiment, the short-duration stimuli includes N stimulus signals (i.e., excitation signals) $x_1$, $x_2$, . . . , and $x_N$ for simultaneously exciting the N loudspeakers $LS_1$, $LS_2$, . . . , and $LS_N$, respectively. The N loudspeakers within the room 150 are simultaneously excited with the short-duration stimuli, and loudspeaker-room impulse responses (i.e., magnitude and phase) of the N loudspeakers are simultaneously extracted from one or more measurements (i.e., recordings) recorded via the M microphones. The loudspeaker-room impulse responses of the N loudspeakers within the room 150 are measured at the M microphones simultaneously (i.e., in parallel).

In one embodiment, each of the N stimulus signals starts at a different initial point of the short-duration stimuli. In one embodiment, each of the N stimulus signals has the same duration.

In one embodiment, the stimuli determination unit 205 generates, as the short-duration stimuli, a logarithmic sweep (i.e., log-sweep) stimuli (or a combination of log-sweep stimuli). For example, in one embodiment, if the N loudspeakers comprise 11 distinct loudspeakers (i.e., N=11) providing 11 loudspeaker channels and arranged in a 7.1.4 loudspeaker setup, the stimuli determination unit 205 generates, as the short-duration stimuli, an 11-channel log-sweep stimuli. Specifically, the stimuli determination unit 205 optimizes one or more stimuli parameters a-priori using Bayesian optimization, and generates the 11-channel log-sweep stimuli based on the one or more optimized stimuli parameters.

In one embodiment, the stimuli determination unit 205 optimizes one or more stimuli parameters by applying to training data a machine learning algorithm for Bayesian optimization that operates in the frequency domain. Table 1 below provides example pseudo-code of a machine learning algorithm for Bayesian optimization, in the frequency domain, of stimuli parameters for an 11-channel log-sweep stimuli, implemented by the stimuli determination unit 205.

TABLE 1

| | |
|---|---|
| | Result: log-sweep($P^*$ ,$M_i^*$), i = 1, . . . , 10; $\phi_{SD} < 0$ |
| 1 | Initialize bayesopt: Gaussian Process Active Size=GPA, Number of Seed Points=NP, Exploration Ratio=ER, TR = 20 and true MARDY responses $\underline{h}_j^{(k)}$; j = 1, . . . , 11; k = 1, 2, . . . , TR ; |
| 2 | while maxTime ≤ 10,800 seconds do |
| 3 | \| For each $\hat{P}$ and $\hat{M}_i$ candidate, construct 11-channel log-sweep |
| 4 | \| Compute the convolution sum using true responses and log-sweep with candidate $\hat{P}$ and $\hat{M}_i$; |
| 5 | \| Estimate the responses |
| 6 | \| Minimize: $\overline{\phi}_{SD} = \overline{\phi}_{SD}^{bayes} - \overline{\phi}_{SD}^{orignial}$ |
| 7 | \| Update hyper-parameters ($\hat{P}$, $\hat{M}_i$) using bayesopt: |
| 8 | end |

In Table 1, $\underline{h}_j^{(k)}$ denotes a loudspeaker-room impulse response included in training data comprising true impulse responses from MARDY, wherein j=1, . . . , 11, k=1, . . . , TR, and TR is a size of the training data (i.e., number of true impulse responses from MARDY). In Table 1, ($\hat{P}$, $\hat{M}_i$) denotes candidate hyper-parameters representing candidate stimuli parameters for the 11-channel log-sweep stimuli, and ($P^*$, $M_i^*$) denotes optimized hyper-parameters representing optimized stimuli parameters for the 11-channel log-sweep stimuli.

As shown in Table 1, the stimuli determination unit 205 iteratively updates the candidate hyper-parameters ($\hat{P}$, $\hat{M}_i$) until convergence to the optimized hyper-parameters ($P^*$, $M_i^*$). Specifically, each iteration includes the following operations: The stimuli determination unit 205 first constructs 11 log-sweep stimulus signals $x_1$, $x_2$, . . . , and $x_{11}$ based on the candidate hyper-parameters ($\hat{P}$, $\hat{M}_i$), in accordance with equations (1)-(2) provided below:

$$\underline{x}_1(n)=(x(n),x(n-1), \ldots ,x(n-\hat{P}+1))^T \quad (1), \text{ and}$$

$$\underline{x}_j(n)=(x(\langle n-\hat{M}_j-1 \rangle_{\hat{P}}),x(\langle n-\hat{M}_{j-1}-1 \rangle_{\hat{P}}), \ldots , x(\langle n-\hat{M}_{j-1}-\hat{P}+1 \rangle_{\hat{P}})^T \quad (2),$$

wherein j=2, . . . , 11. The stimuli determination unit 205 then computes a convolution sum based on the true impulse responses from MARDY and the 11 log-sweep stimulus signals $x_1$, $x_2$, . . . , and $x_{11}$, and estimates loudspeaker-room impulse responses, in accordance with equations (3)-(6) provided below:

$$S_{\underline{x}_j,\underline{x}_j}\left(e^{j\omega}\right)\mathcal{F}\{\underline{x}(n)\}\mathcal{F}\{\underline{x}(n)\}^*, \tag{3}$$

$$S_{\underline{x}_j,\underline{y}_j}\left(e^{j\omega}\right)=\mathcal{F}\{\underline{\rho}_{\left(\underline{x}_j(n),\underline{y}_j(n)\right)}\}=\mathcal{F}\{\underline{x}(n)\}\mathcal{F}\left\{\underline{y}(n)\right\}^*, \tag{4}$$

$$\hat{H}_{i,j}\left(e^{j\omega}\right)=\frac{S_{\underline{x}_j,\underline{y}_j}\left(e^{j\omega}\right)}{S_{\underline{x}_j,\underline{x}_j}\left(e^{j\omega}\right)},\text{ and} \tag{5}$$

$$\underline{\hat{h}}_j=\mathcal{F}^{-1}\left\{\hat{H}_{i,j}\left(e^{j\omega}\right)\right\}, \tag{6}$$

wherein $\underline{\hat{h}}_j$ denotes an estimated (i.e., deconvolved) loudspeaker-room impulse response $\mathcal{F}$ ("estimated impulse response"), and $\mathcal{F}$ denotes a fast frequency domain operation (e.g., Fast Fourier transform). The stimuli determination unit 205 then minimizes or reduces a magnitude response error $\phi_{SD}$ in the frequency domain, in accordance with equations (7)-(8) provided below:

$$\phi_{SD,i}=\sqrt{\frac{1}{(\omega_2-\omega_1)}\int_{\omega_1}^{\omega_2}\left[10\log_{10}\frac{\left|H_{i,j}\left(e^{j\omega}\right)\right|}{\left|\hat{H}_{i,j}\left(e^{j\omega}\right)\right|}\right]^2 d\omega}, \tag{7}$$

wherein $\omega_1$ is a first/start frequency, and $\omega_2$ is a last/final frequency, and $$\phi_{SD}=\Sigma_{i=1}^{11}\phi_{SD,i} \tag{8}.$$

The stimuli determination unit 205 then updates the candidate hyper-parameters ($\hat{P}$, $\hat{M}_i$).

The algorithm of Table 1 optimizes the short-duration stimuli to give a minimal possible error (i.e., magnitude response error $\phi_{SD}$) on a test set. Upon convergence to optimality via Bayesian optimization in the frequency domain, the stimuli determination unit 205 generates the 11-channel log-sweep stimuli comprising 11 log-sweep stimulus signals $x_1$, $x_2$, . . . , and $x_{11}$ based on the optimized hyper-parameters (P*, $M_i$*), in accordance with equations (9)-(10) provided below:

$$x_1(n)=(x(n),x(n-1),\ldots,x(n-P^*+1))^T \tag{9}, \text{ and}$$

$$x_j(n)=(x\langle n-M_{j-1}^*\rangle_{P^*})x(\langle n-M_{j-1}^*-1\rangle_{P^*}),\ldots,\; x(\langle n-M_{j-1}^*-P^*+\mathbf{1}\rangle_{P^*}))^T \tag{10},$$

wherein j=2, . . . , 11.

Table 2 below provides example Bayesian optimized stimuli parameters (i.e., the optimized hyper-parameters (P*, $M_i$*)) resulting from the algorithm of Table 1.

TABLE 2

| Bayesian Optimized Stimuli Parameter (GPA = 600, NP = 5, ER = 0.5) | Value |
|---|---|
| P* (samples) | 133142 [2.7738 seconds] |
| $M_1$* (samples) | 6525 |
| $M_2$* (samples) | 40836 |
| $M_3$* (samples) | 28776 |
| $M_4$* (samples) | 70508 |
| $M_5$* (samples) | 140425 |
| $M_6$* (samples) | 159714 |
| $M_7$* (samples) | 33355 |

TABLE 2-continued

| Bayesian Optimized Stimuli Parameter (GPA = 600, NP = 5, ER = 0.5) | Value |
|---|---|
| $M_8$* (samples) | 108856 |
| $M_9$* (samples) | 84159 |
| $M_{10}$* (samples) | 186550 |

Due to the cyclic shift of the short-duration stimuli and the algorithm of Table 1 operating in the frequency domain to reduce the magnitude response error $\phi_{SD}$, estimated impulse responses in the time domain may include artifacts ("time domain aliasing artifacts"). For example, an estimated impulse response may be aliased into the tail-end of another estimated impulse response (i.e., reverberation). Other examples of time domain aliasing artifacts include, but are not limited to, truncation, mis-estimation, etc.

In one embodiment, the short-duration stimuli is continuous and circularly rotated to allow capture of reverberation (e.g., low-frequency reverberation) of an arbitrary duration. For example, in one embodiment, an amount of circular shift based on M (i.e., circular shift of M samples) is set to ensure that a low-frequency reverberation tail duration is captured reliably in an estimated impulse response in the time domain; such circular rotation ensures the estimated impulse response is free of time domain aliasing artifacts (e.g., reverberation, truncation, or mis-estimation).

In one embodiment, the stimuli determination unit 205 minimizes or reduces time domain aliasing artifacts and optimizes one or more stimuli parameters by applying to training data a machine learning algorithm for Bayesian optimization that operates in the time domain. Table 3 below provides example pseudo-code of a machine learning algorithm for Bayesian optimization, in the time domain, of stimuli parameters for a 11-channel log-sweep stimuli, implemented by the stimuli determination unit 205.

TABLE 3

```
Result: log-sweep(P* ,Mi*), i = 1, . . . , 10; ψ̄SD ≈ 0
Initialize bayesopt: Gaussian Process Active
   Size=GPA, Number of Seed Points=NP, Exploration
   Ratio=ER, TR = 20 and true MARDY responses
   hj^(k); j = 1, . . . , 1; k = 1, 2, . . . , TR ;
while maxTime ≤ 10,800 seconds do
   | For each P̂ and M̂i candidate, construct 11-channel
   |    log-sweep
   | Compute the convolution sum    using true
   |    responses and log-sweep with candidate P̂ and M̂i;
   | Estimate the responses
   | Minimize: ψ̄SD = ψ̄SD^bayes − ψ̄SD^orignial
   | Update hyperparameters (P̂,M̂i) using bayesopt;
end
```

In Table 3, $\underline{\hat{h}}_j^{(k)}$ denotes a loudspeaker-room impulse response included in training data comprising true impulse responses from MARDY, wherein j=1, . . . , 11, k=1, . . . , TR, and TR is a size of the training data (i.e., number of true impulse responses from MARDY). In Table 3, ($\hat{P}$, $\hat{M}_i$) denotes candidate hyper-parameters representing candidate stimuli parameters for the 11-channel log-sweep stimuli, and (P*, $M_i$*) denotes optimized hyper-parameters representing optimized stimuli parameters for the 11-channel log-sweep stimuli.

As shown in Table 3, the stimuli determination unit 205 iteratively updates the candidate hyper-parameters ($\hat{P}$, $\hat{M}_i$) until convergence to the optimized hyper-parameters (P*, $M_i$*). Specifically, each iteration includes the following operations: The stimuli determination unit 205 first constructs 11 log-sweep stimulus signals $x_1$, $x_2$, . . . , and $x_{11}$ based on the candidate hyper-parameters ($\hat{P}$, $\hat{M}_i$), in accordance with equations (1)-(2) provided above. The stimuli determination unit 205 then computes a convolution sum based on the true impulse responses from MARDY and the 11 log-sweep stimulus signals $x_1$, $x_2$, . . . , and $x_{11}$, and estimates loudspeaker-room impulse responses, in accordance with equations (3)-(6) provided above. The stimuli determination unit 205 then minimizes or reduces a magnitude response error $\phi_{SD}$, in accordance with equations (11)-(12) provided below:

$$\psi_{SD} = \sqrt{\frac{1}{11}\sum_{j=1}^{11}\left(\hat{h}_j - \underline{h}_j\right)^T\left(\hat{h}_j - \underline{h}_j\right)}, \text{ and} \quad (11)$$

$$\psi_{SD} = \sum_{k=1}^{TR} \psi_{SD}. \quad (12)$$

The stimuli determination unit 205 then updates the candidate hyper-parameters (P, Mt).

The algorithm of Table 3 optimizes the short-duration stimuli to give a minimal possible error (i.e., magnitude response error $\psi_{SD}$) on a test set. Upon convergence to optimality via Bayesian optimization in the time domain, the stimuli determination unit 205 generates the 11-channel log-sweep stimuli comprising 11 log-sweep stimulus signals $x_1$, $x_2$, . . . , and $x_{11}$ based on the optimized hyper-parameters ($P^*$, $M_i^*$), in accordance with equations (9)-(10) provided above.

In one embodiment, the stimuli determination unit 205 is integrated into, or implemented as part of, a distributed DSP/CPU of the loudspeakers 121, a centralized DSP/CPU of an electronic device (e.g., an electronic device 110 such as a TV), a centralized DSP of a loudspeaker 121, or a local/remote server (e.g., remote computing environment 140).

In one embodiment, the loudspeaker-room equalization system 200 comprises a first pre-amplifier 210 configured to: (1) receive (e.g., from the stimuli determination unit 205) short-duration stimuli (e.g., 11-channel log-sweep stimuli) that includes N stimulus signals $x_1$, $x_2$, . . . , and $x_N$, (2) amplify/boost the N stimulus signals, and (3) deliver the N stimulus signals $x_1$, $x_2$, . . . , and $x_N$ to the N loudspeakers $LS_1$, $LS_2$, . . . , and $LS_N$, respectively, at the same time for playback to simultaneously excite all the N loudspeakers 121 within the room 150. Specifically, each loudspeaker i reproduces a stimulus signal $x_i$ in response to receiving the stimulus signal $x_i$ from the first pre-amplifier 210. The N loudspeakers 121 within the room 150 are simultaneously excited with the short-duration stimuli having one or more stimuli parameters optimized a-priori (e.g., via the stimuli determination unit 205) over training data.

In one embodiment, the P microphones 122 $MIC_1$, $MIC_2$, . . . , and $MIC_P$ simultaneously measure/record audio/sound arriving at the P microphones $MIC_1$, $MIC_2$, . . . , and $MIC_P$, respectively, resulting in P measurements/recordings measured/recorded at P microphone positions (i.e., microphone positions of the P microphones).

In one embodiment, the loudspeaker-room equalization system 200 comprises a second pre-amplifier 220 configured to: (1) receive P measurements/recordings (e.g., from the P microphones 122), and (2) amplify/boost the P measurements/recordings.

In one embodiment, the loudspeaker-room equalization system 200 comprises a simultaneous deconvolution engine 230 configured to: (1) receive K measurements/recordings (e.g., from the second pre-amplifier 220), (2) receive (e.g., from the stimuli determination unit 205) short-duration stimuli (e.g., 11-channel log-sweep stimuli) that includes N stimulus signals $x_1$, $x_2$, . . . , and $x_N$, and (3) for each of the K microphone positions, perform simultaneous deconvolution to simultaneously deconvolve N estimated impulse responses using a single recording from the K measurements/recordings, wherein the single recording is measured/recorded at the microphone position after all the N loudspeakers 121 are simultaneously excited with the short-duration stimuli. The simultaneous deconvolution includes applying an extraction algorithm to the K measurements/recordings to simultaneously extract the N estimated impulse responses (i.e., simultaneous extraction routine), wherein the extraction algorithm is based on the N stimulus signals. The N estimated impulse responses include an estimated impulse response of each of the N loudspeakers 121.

Therefore, the loudspeaker-room equalization system 200 performs a measurement process that involves in-situ, or in-room, measurement by simultaneously exciting all the N loudspeakers 121 within the room 150 with a short-duration stimuli, and estimating N loudspeaker-room impulse responses based on the short-duration stimuli and the P measurements/recordings. All the N loudspeakers 121 are playing (simultaneously excited) during the measurement process. For each loudspeaker i of the N loudspeakers 121, the measurement process involves the first pre-amplifier 210 providing, for playback at the loudspeaker i, a different initial point of the stimuli, and the simultaneous deconvolution engine 230 processing the playback at the loudspeaker i based on the different initial point of the stimuli. In one embodiment, the playback at each loudspeaker i has the same duration (i.e., each of the N stimulus signals has the same duration).

In one embodiment, the simultaneous deconvolution engine 230 is integrated into, or implemented as part of, a distributed DSP/CPU of the loudspeakers 121, a centralized DSP/CPU of an electronic device (e.g., an electronic device 110 such as a TV), a CPU of a mobile device (e.g., an electronic device 110 such as a smart phone), a centralized DSP of a loudspeaker 121, or a local/remote server (e.g., remote computing environment 140).

To simultaneously deconvolve N estimated impulse responses, the simultaneous deconvolution engine 230 applies one or more linearly-optimal techniques. Let y(n) generally denote a measurement/recording. Let $h_i(n)$ generally denote a true impulse response of loudspeaker i. A measurement/recording y(n) is expressed in accordance with equation (13) provided below:

$$y(n)=\Sigma_{i=1}^{N} x_i(n) \circledast h_i(n) \quad (13).$$

In one embodiment, as part of the simultaneous deconvolution, the simultaneous deconvolution engine 230 is configured to estimate a loudspeaker-room impulse response of each of the N loudspeakers 121. Let $\hat{h}_i$(n) generally denote an estimated impulse response of loudspeaker i. In one embodiment, the simultaneous deconvolution engine 230 determines an estimated impulse response $\hat{h}_i$(n) of loudspeaker i in accordance with equation (14) provided below:

$$\hat{h}_i(n)=\rho_{(x_j(n),y(n))} \quad (14).$$

Let $e_i$(n) generally denote a time domain error representing a difference between a true impulse response $h_i$(n) of loudspeaker i and an estimated impulse response $\hat{h}_i$(n) of loudspeaker i in the time domain. In one embodiment, a time domain error $e_i(n)$ is expressed in accordance with equation (15) provided below:

$$e_i(n)=20\ \log_{10}|h_i(n)-\hat{h}_i(n)| \quad (15).$$

In one embodiment, the loudspeaker-room equalization system 200 comprises an equalization/calibration unit 240 configured to: (1) receive (e.g., from the simultaneous deconvolution engine 230) N estimated impulse responses, and (2) perform equalization/calibration of all the N loudspeakers 121 within the room 150 based on the N estimated impulse responses per microphone position. For example, the equalization/calibration may involve computing one or more equalization filters that are immediately programmed onto a DSP (e.g., a DSP of a loudspeaker 121). The equalization/calibration facilitates creating a high-quality immersive spatial audio experience for a listener/user (e.g., within the room 150 or within proximity of the N loudspeakers 121).

As shown in Tables 1 and 3, as part of Bayesian optimization, random combinations of 11-channel loudspeaker-room impulse responses are selected from MARDY to form test sets for simulation. FIGS. 3A-3C and 4A-4C illustrate plots for different test sets selected from MARDY for simulation. FIGS. 3A-3C and 4A-4C also compare true impulse responses against estimated impulse responses of 11 loudspeaker channels provided by 11 distinct loudspeakers arranged in a 7.1.4 loudspeaker setup.

Figure 3A:
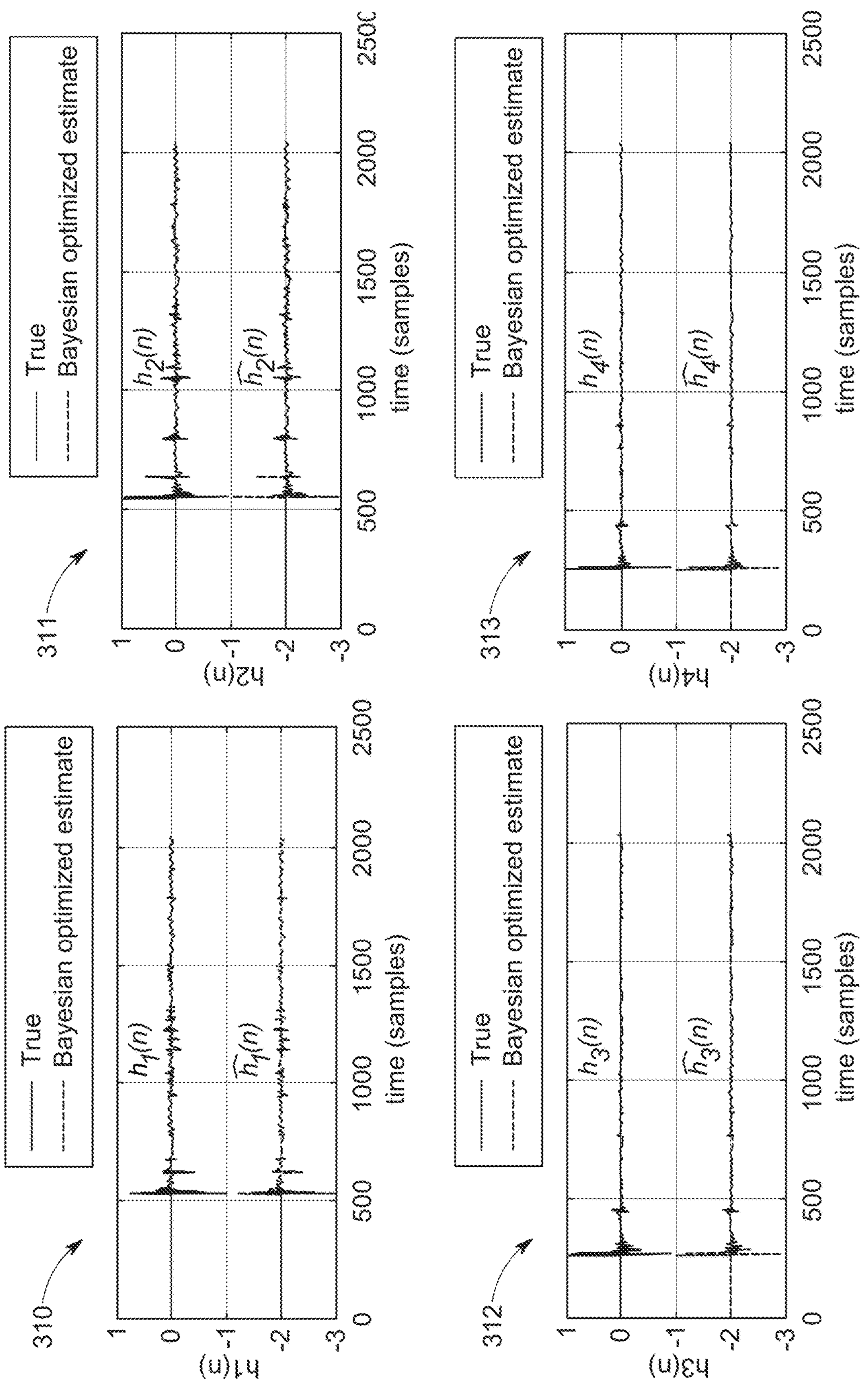
FIG. 3A illustrates example plots comparing a first test set comprising a first random combination of true impulse responses against estimated impulse responses determined based on an 11-channel log-sweep stimuli with Bayesian optimized (in the frequency domain) stimuli parameters, in one or more embodiments.
Figure 3A:
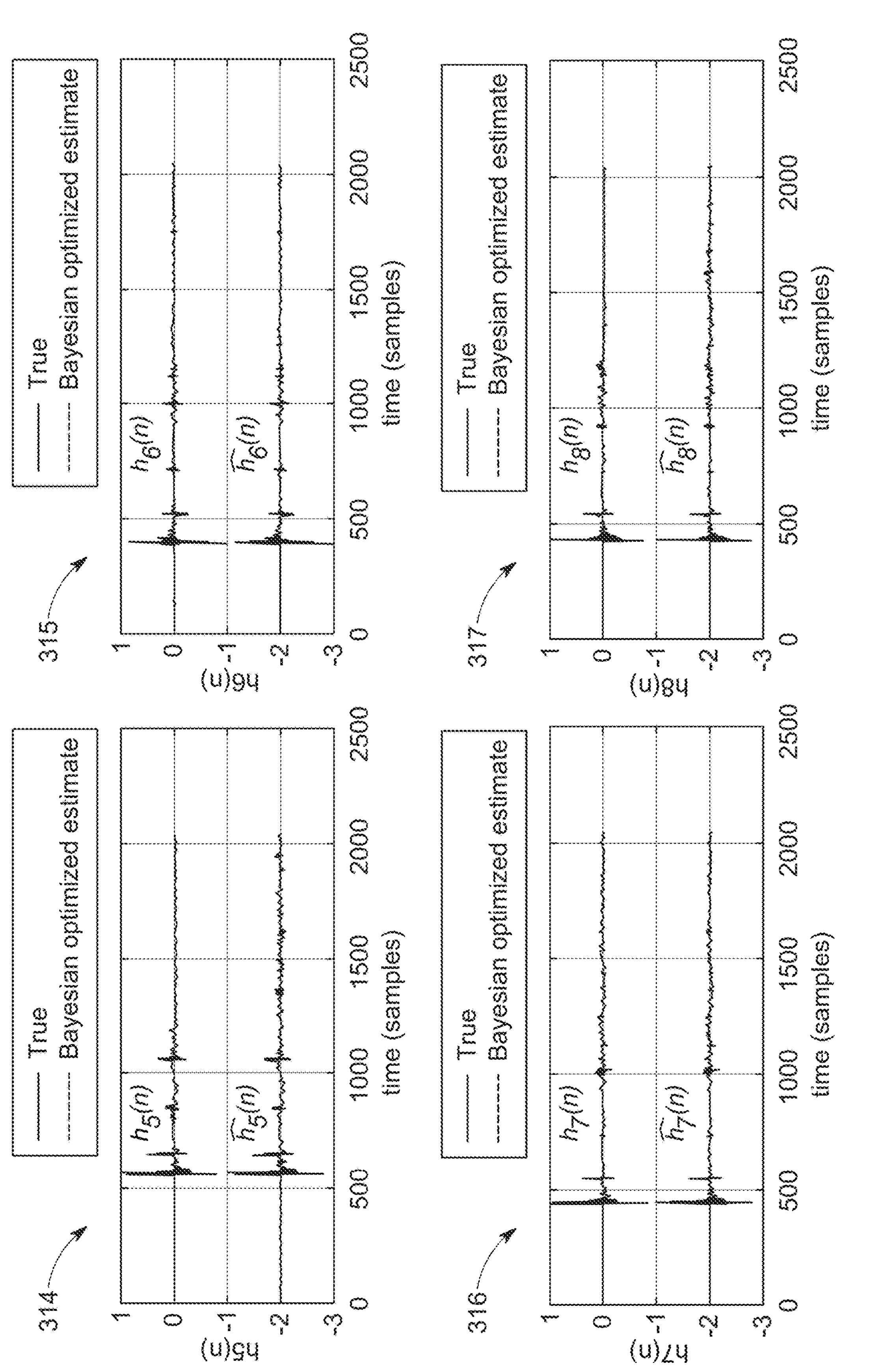
Figure 3A:
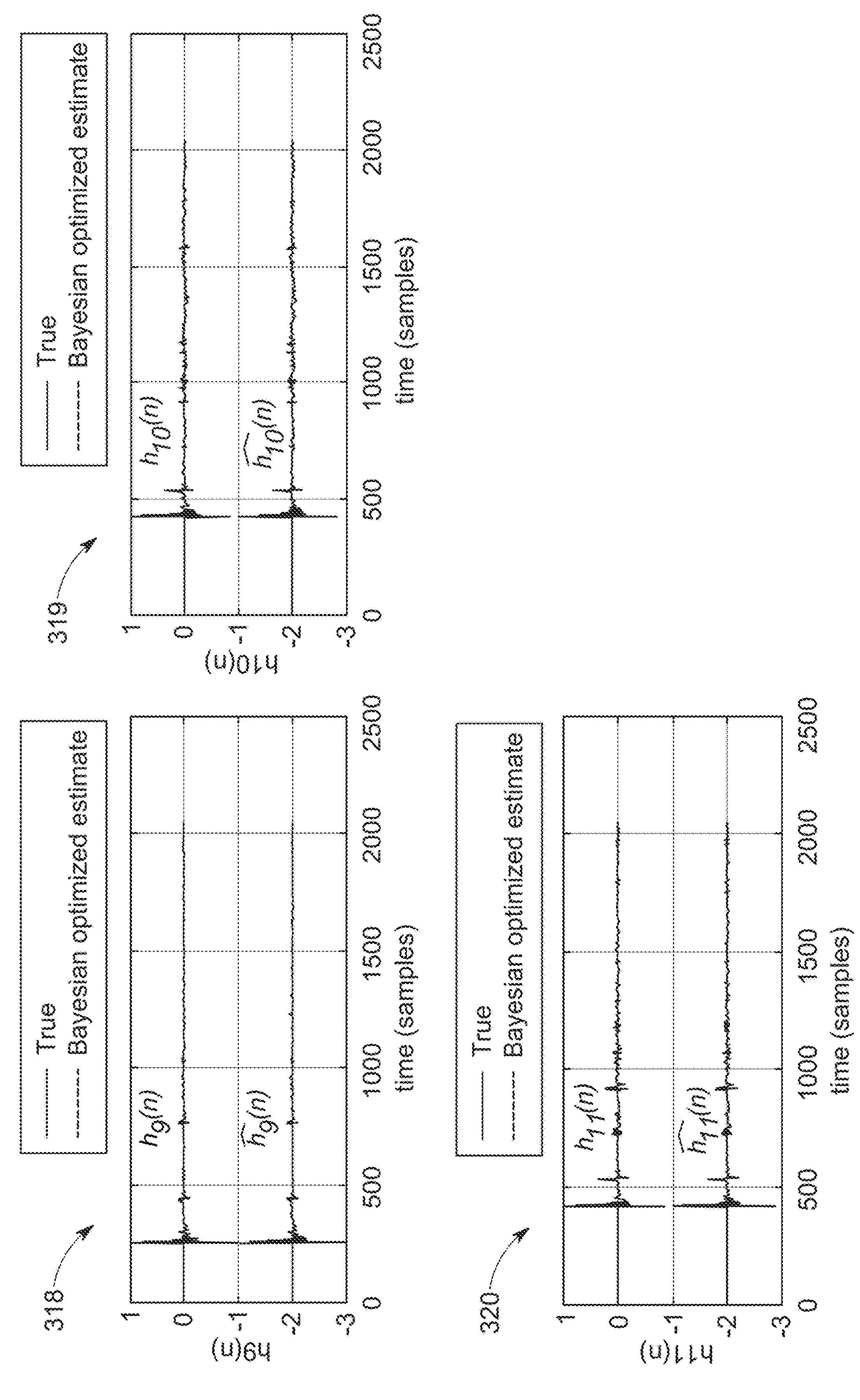

FIG. 3A illustrates example plots 310-320 comparing a first test set comprising a first random combination of true impulse responses against estimated impulse responses determined based on an 11-channel log-sweep stimuli with Bayesian optimized (in the frequency domain) stimuli parameters, in one or more embodiments. A horizontal axis of each plot 310-320 represents time in seconds. A vertical axis of each plot 310-320 represents amplitude. In one embodiment, the loudspeaker-room equalization system 200, via the simultaneous deconvolution engine 230, utilizes the 11-channel log-sweep stimuli with the Bayesian optimized (in the frequency domain) stimuli parameters to simultaneously extract 11 estimated impulse responses $\hat{h}_1(n)$, $\hat{h}_2(n)$, . . . , and $\hat{h}_{11}(n)$. For clarity, the 11 estimated impulse responses $\hat{h}_1(n)$, $\hat{h}_2(n)$, . . . , and $\hat{h}_{11}(n)$ are offset/shifted along the vertical axis.

Plot 310 compares a true impulse response $h_1(n)$ against the estimated impulse response $\hat{h}_1(n)$ of a first loudspeaker channel, plot 311 compares a true impulse response $h_2(n)$ against the estimated impulse response $\hat{h}_2(n)$ of a second loudspeaker channel, plot 312 compares a true impulse response $h_3(n)$ against the estimated impulse response $\hat{h}_3(n)$ of a third loudspeaker channel, plot 313 compares a true impulse response $h_4(n)$ against the estimated impulse response $\hat{h}_4(n)$ of a fourth loudspeaker channel, plot 314 compares a true impulse response $h_5(n)$ against the estimated impulse response $\hat{h}_5(n)$ of a fifth loudspeaker channel, plot 315 compares a true impulse response $h_6(n)$ against the estimated impulse response $\hat{h}_6(n)$ of a sixth loudspeaker channel, plot 316 compares a true impulse response $h_7(n)$ against the estimated impulse response $\hat{h}_7(n)$ of a seventh loudspeaker channel, plot 317 compares a true impulse response $h_8(n)$ against the estimated impulse response $\hat{h}_8(n)$ of an eighth loudspeaker channel, plot 318 compares a true impulse response $h_9(n)$ against the estimated impulse response $\hat{h}_9(n)$ of a ninth loudspeaker channel, plot 319 compares a true impulse response $h_{10}(n)$ against the estimated impulse response $\hat{h}_{10}(n)$ of a tenth loudspeaker channel, and plot 320 compares a true impulse response $h_{11}(n)$ against the estimated impulse response $\hat{h}_{11}(n)$ of an eleventh loudspeaker channel.

Figure 3B:
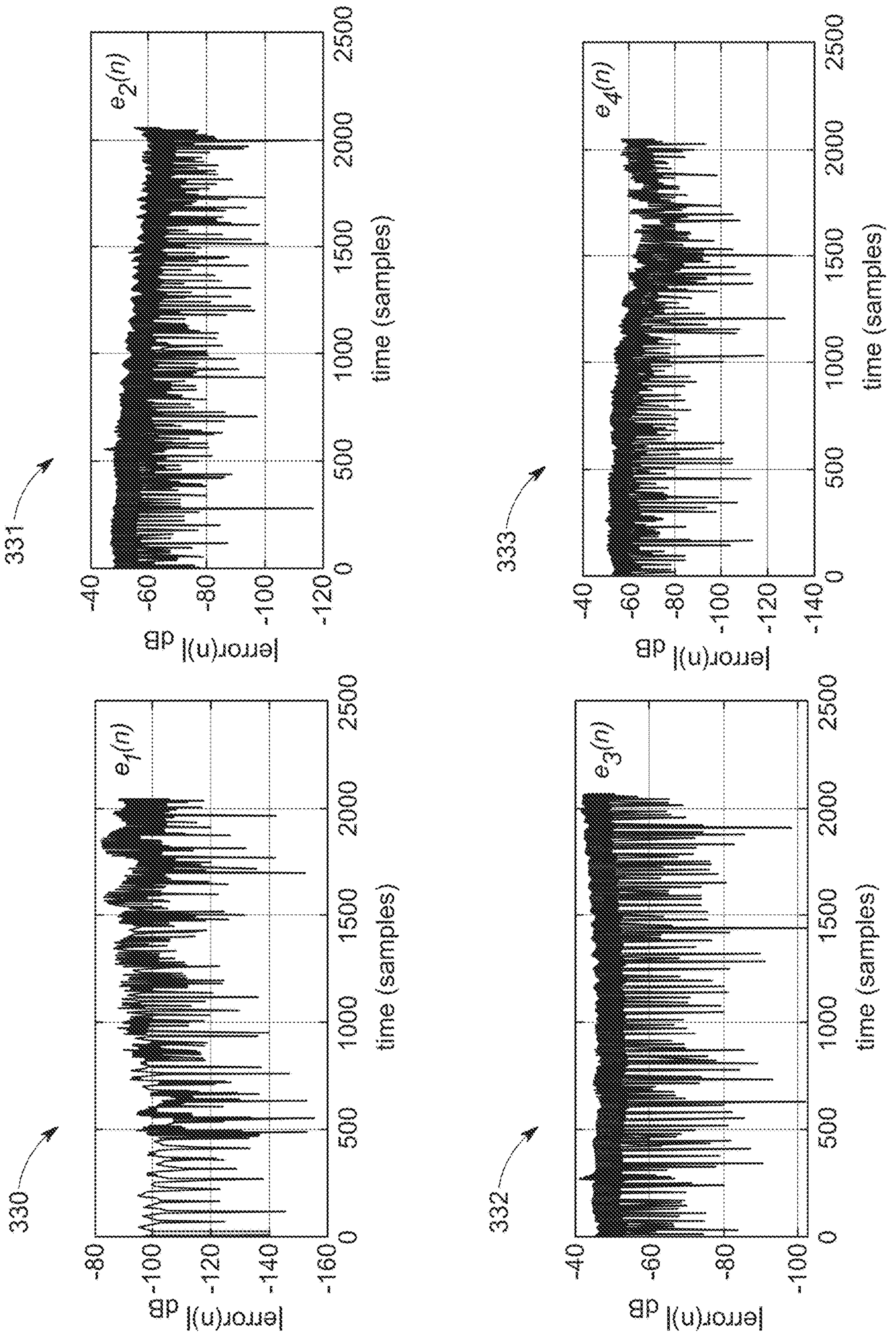
FIG. 3B illustrates example plots of time domain errors between the true impulse responses and the estimated impulse responses of FIG. 3A, in one or more embodiments.
Figure 3B:
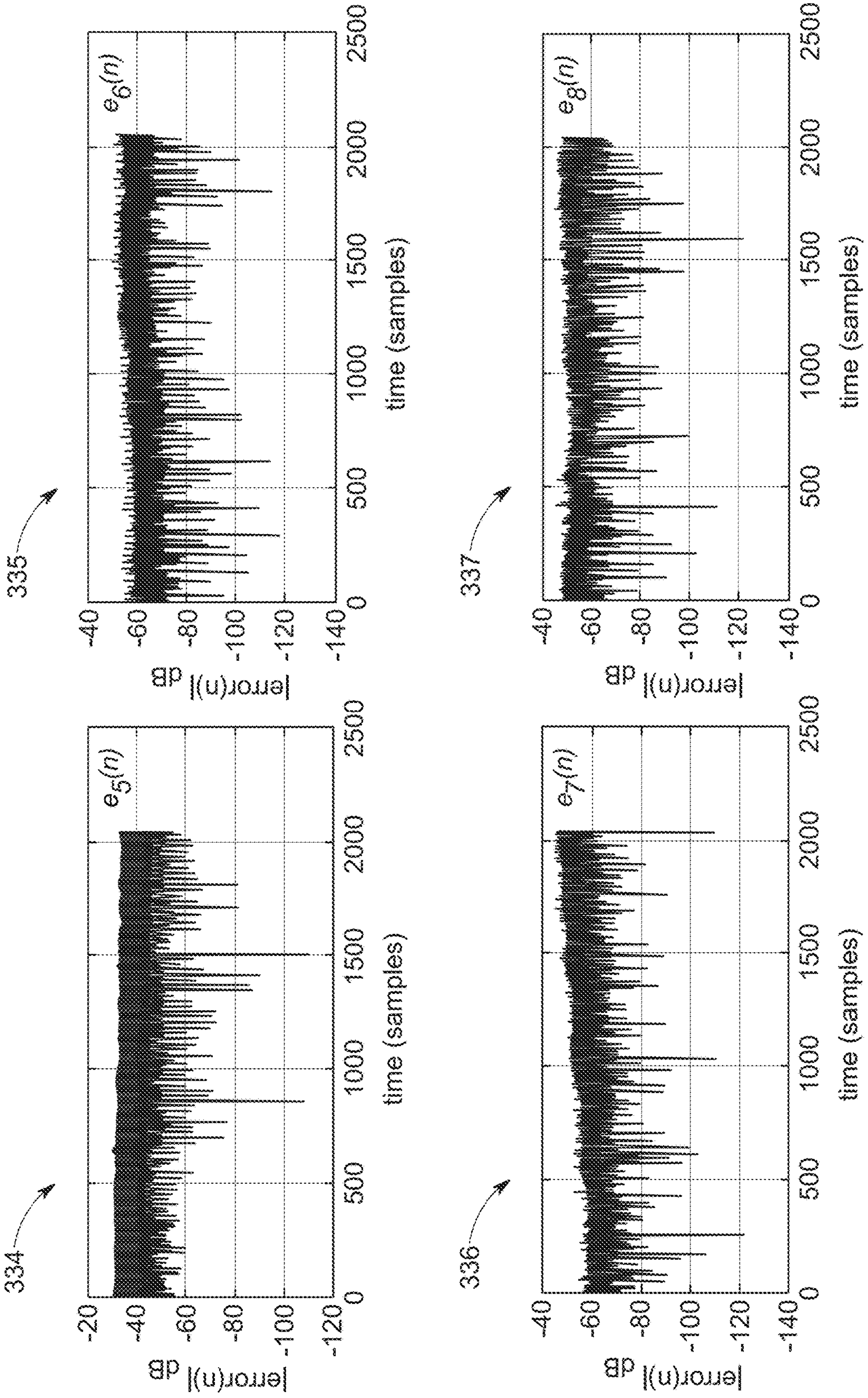
Figure 3B:
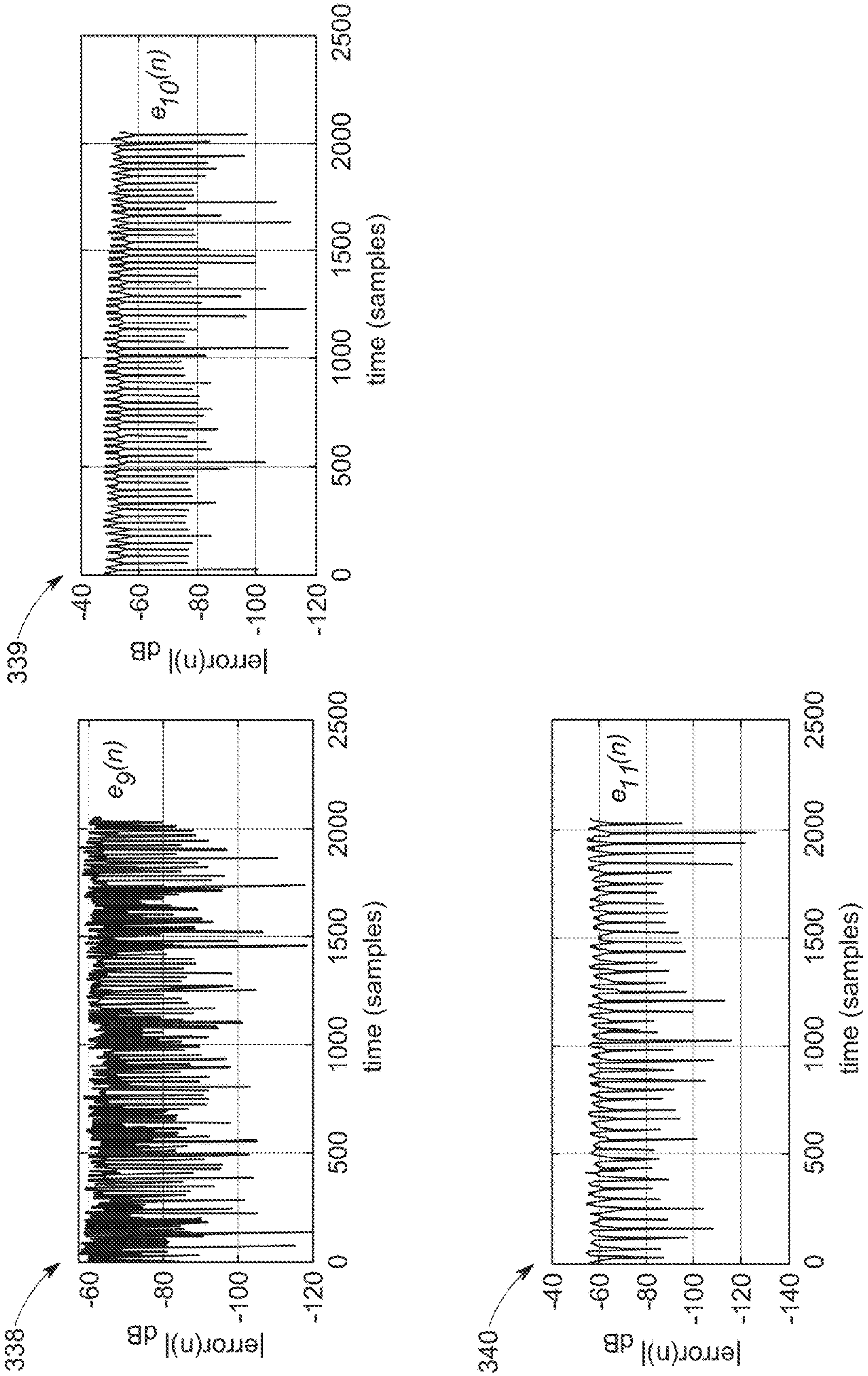

FIG. 3B illustrates example plots 330-340 of time domain errors between the true impulse responses and the estimated impulse responses of FIG. 3A, in one or more embodiments. A horizontal axis of each plot 330-340 represents time in seconds. A vertical axis of each plot 330-340 represents difference. Plot 330 is a first time domain error $e_1(n)$ (i.e., 20 $\log_{10}|h_1(n)-\hat{h}_1(n)|$) for the first loudspeaker channel, plot 331 is a second time domain error $e_2(n)$ (i.e., 20 $\log_{10}|h_2(n)-\hat{h}_2(n)|$) for the second loudspeaker channel, plot 332 is a third time domain error $e_3(n)$ (i.e., 20 $\log_{10}|h_3(n)-\hat{h}_3(n)|$) for the third loudspeaker channel, plot 333 is a fourth time domain error $e_4(n)$ (i.e., 20 $\log_{10}|h_4(n)-\hat{h}_4(n)|$) for the fourth loudspeaker channel, plot 334 is a fifth time domain error $e_5(n)$ (i.e., 20 $\log_{10}|h_5(n)-\hat{h}_5(n)|$) for the fifth loudspeaker channel, plot 335 is a sixth time domain error $e_6(n)$ (i.e., 20 $\log_{10}|h_6(n)-\hat{h}_6(n)|$) for the sixth loudspeaker channel, plot 336 is a seventh time domain error $e_7(n)$ (i.e., 20 $\log_{10}|h_7(n)-\hat{h}_7(n)|$) for the seventh loudspeaker channel, plot 337 is an eighth time $\hat{h}_8$ domain error $e_8(n)$ (i.e., 20 $\log_{10}|h_8(n)-\hat{h}_8(n)|$) for the eighth loudspeaker channel, plot 338 is a ninth time domain error $e_9(n)$ (i.e., 20 $\log_{10}|h_9(n)-\hat{h}_9(n)|$) for the ninth loudspeaker channel, plot 339 is a tenth time domain error $e_{10}(n)$ (i.e., 20 $\log_{10}|h_{10}(n)-\hat{h}_{10}(n)|$) for the tenth loudspeaker channel, and plot 340 is an eleventh time domain error $e_{11}(n)$ (i.e., 20 $\log_{10}|h_{11}(n)-\hat{h}_{11}(n)|$) for the eleventh loudspeaker channel.

Figure 3C:
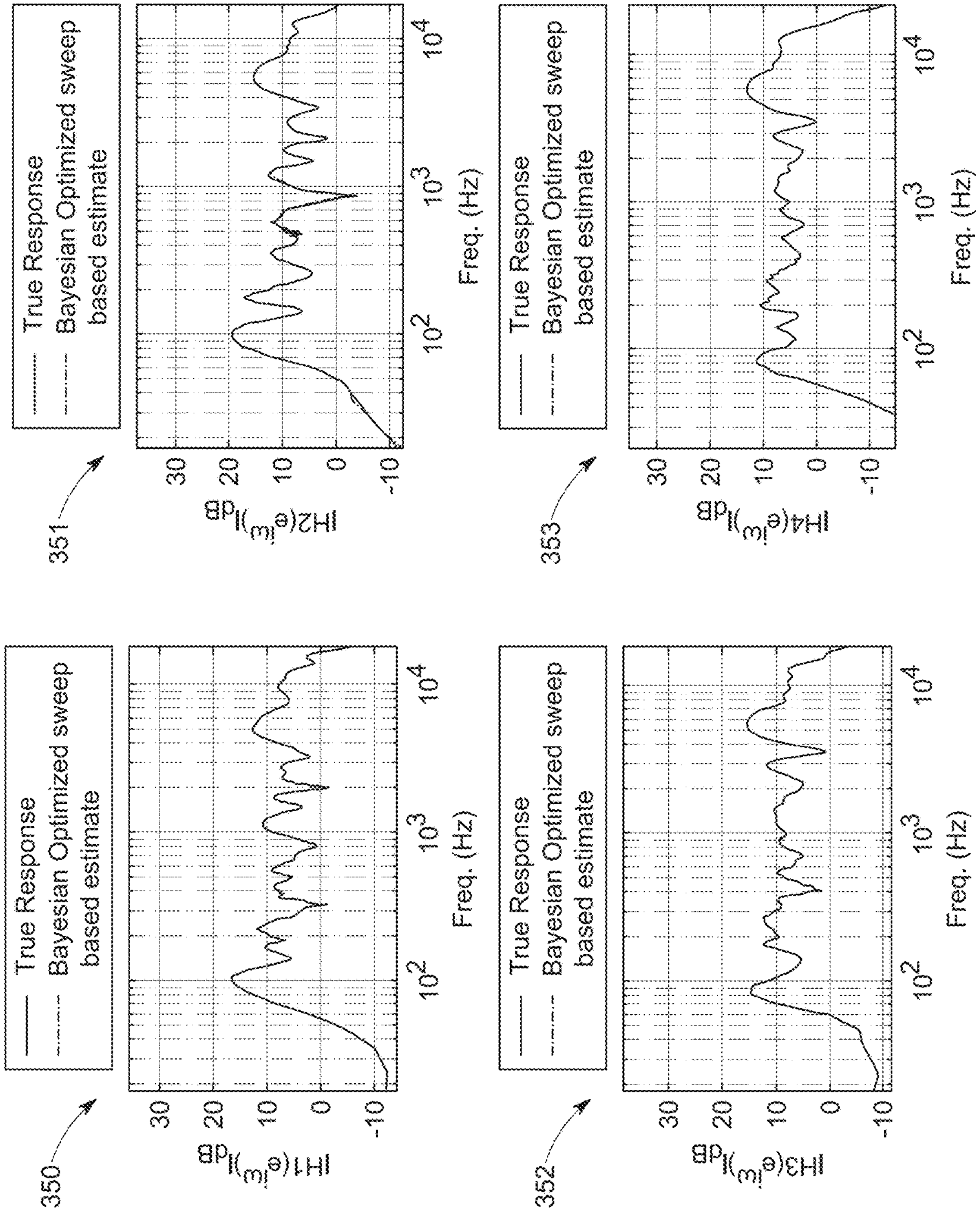
FIG. 3C illustrates example plots of magnitude responses between the true impulse responses and the estimated impulse responses of FIG. 3A, in one or more embodiments.
Figure 3C:
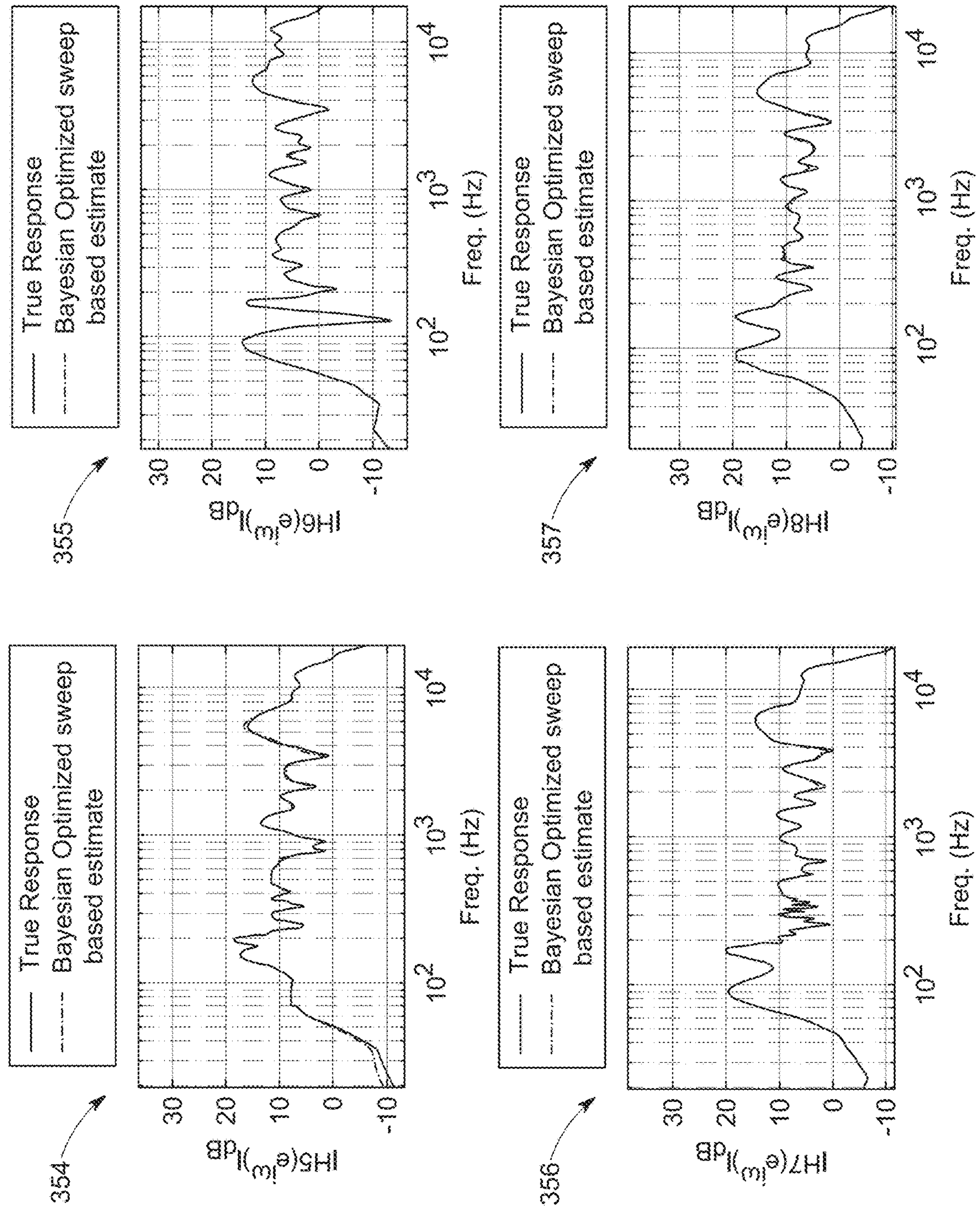
Figure 3C:
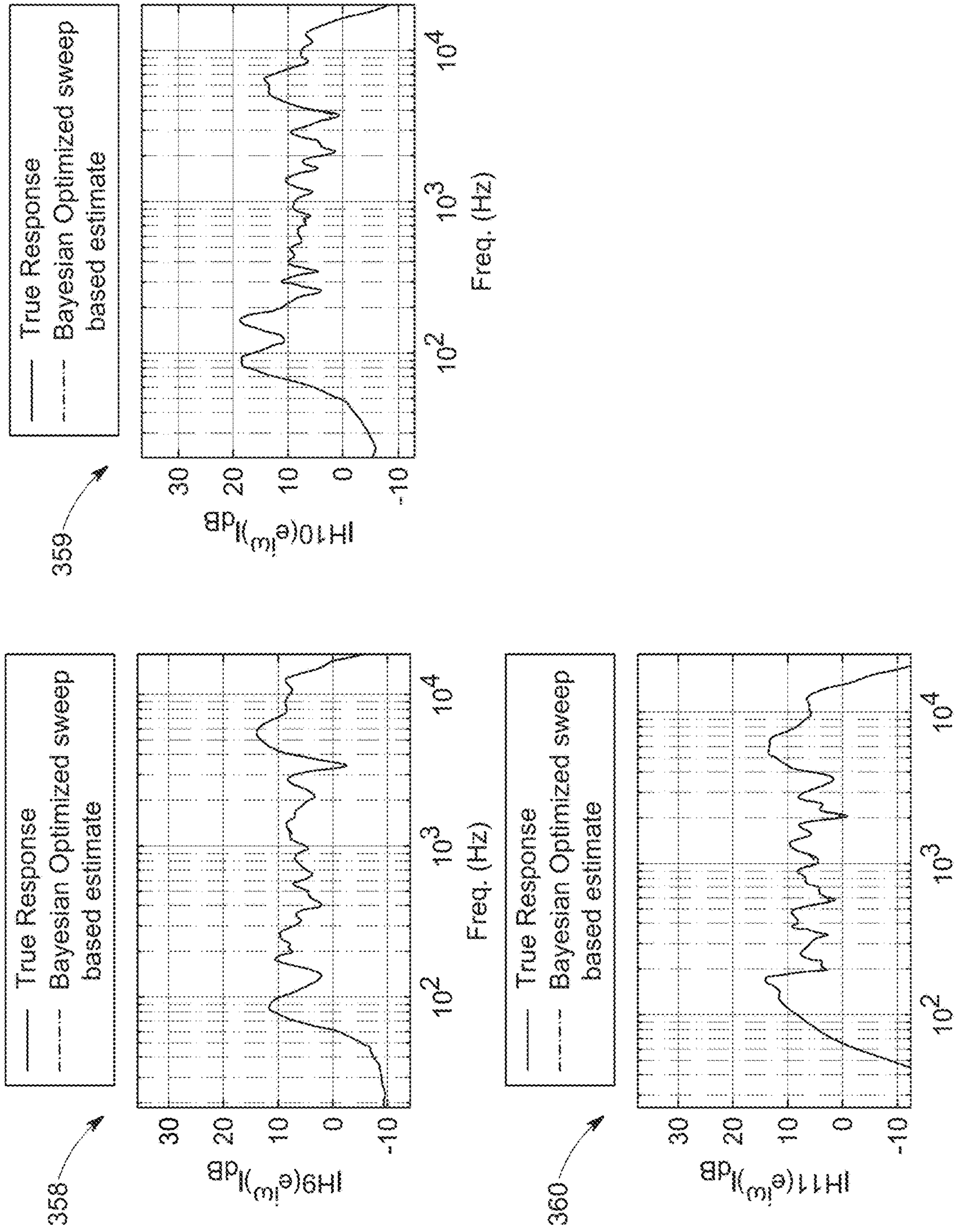

FIG. 3C illustrates example plots 350-360 of magnitude responses between the true impulse responses and the estimated impulse responses of FIG. 3A, in one or more embodiments. A horizontal axis of each plot 350-360 represents frequency in Hertz (Hz). A vertical axis of each plot 350-360 represents magnitude response in decibels (dB).

Plot 350 compares magnitude responses between the true impulse response $h_1(n)$ and the estimated impulse response $\hat{h}_1(n)$ of the first loudspeaker channel, plot 351 compares magnitude responses between the true impulse response $h_2(n)$ and the estimated impulse response $\hat{h}_2(n)$ of the second loudspeaker channel, plot 352 compares magnitude responses between the true impulse response $h_3(n)$ and the estimated impulse response $\hat{h}_3(n)$ of the third loudspeaker channel, plot 353 compares magnitude responses between the true impulse response $h_4(n)$ and the estimated impulse response $\hat{h}_4(n)$ of the fourth loudspeaker channel, plot 354 compares magnitude responses between the true impulse response $h_5(n)$ and the estimated impulse response $\hat{h}_5(n)$ of the fifth loudspeaker channel, plot 355 compares magnitude responses between the true impulse response $h_6(n)$ and the estimated impulse response $\hat{h}_6(n)$ of the sixth loudspeaker channel, plot 356 compares magnitude responses between the true impulse response $h_7(n)$ and the estimated impulse response $\hat{h}_7(n)$ of the seventh loudspeaker channel, plot 357 compares magnitude responses between the true impulse response $h_8(n)$ and the estimated impulse response $\hat{h}_8(n)$ of the eighth loudspeaker channel, plot 358 compares magnitude responses between the true impulse response $h_9(n)$ and the estimated impulse response $\hat{h}_9(n)$ of the ninth loudspeaker channel, plot 359 compares magnitude responses between the true impulse response $h_{10}(n)$ and the estimated impulse response $\hat{h}_{10}(n)$ of the tenth loudspeaker channel, and plot 360 compares magnitude responses between the true impulse response $h_{11}(n)$ and the estimated impulse response $\hat{h}_{11}(n)$ of the eleventh loudspeaker channel.

Figure 4A:
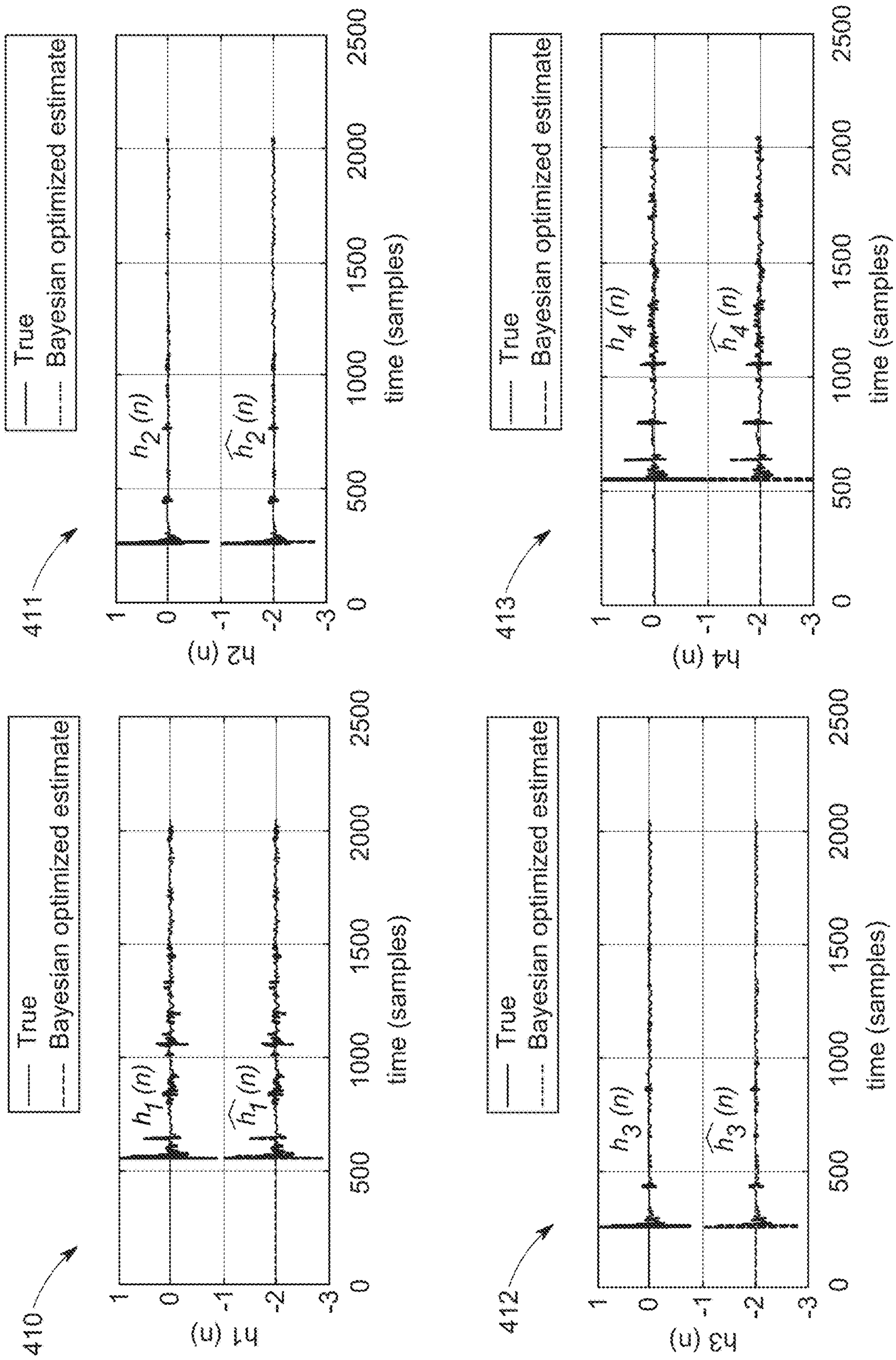
FIG. 4A illustrates example plots comparing a second test set comprising a second random combination of true impulse responses against estimated impulse responses determined based on an 11-channel log-sweep stimuli with Bayesian optimized (in the frequency domain) stimuli parameters, in one or more embodiments.
Figure 4A:
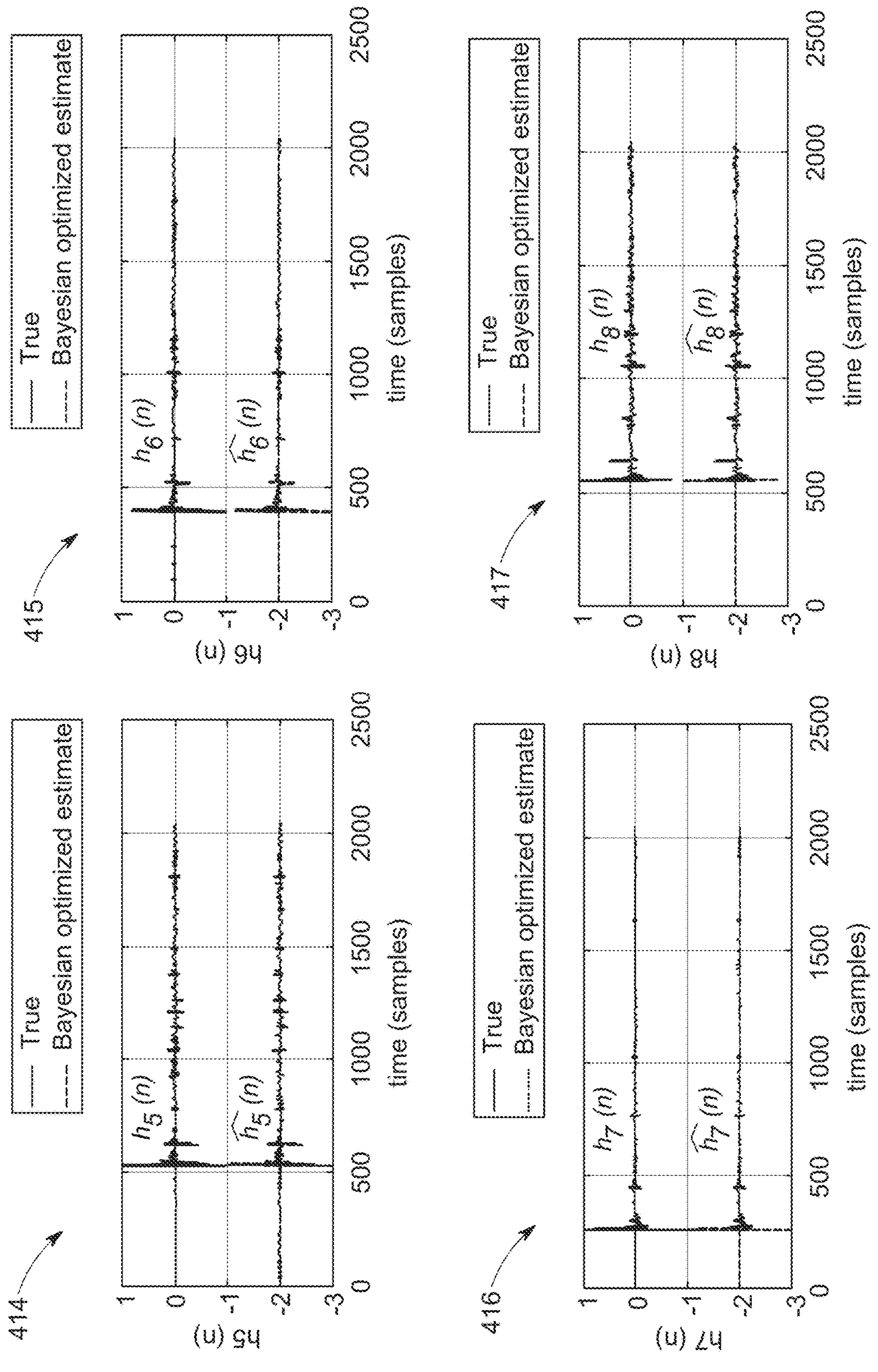
Figure 4A:
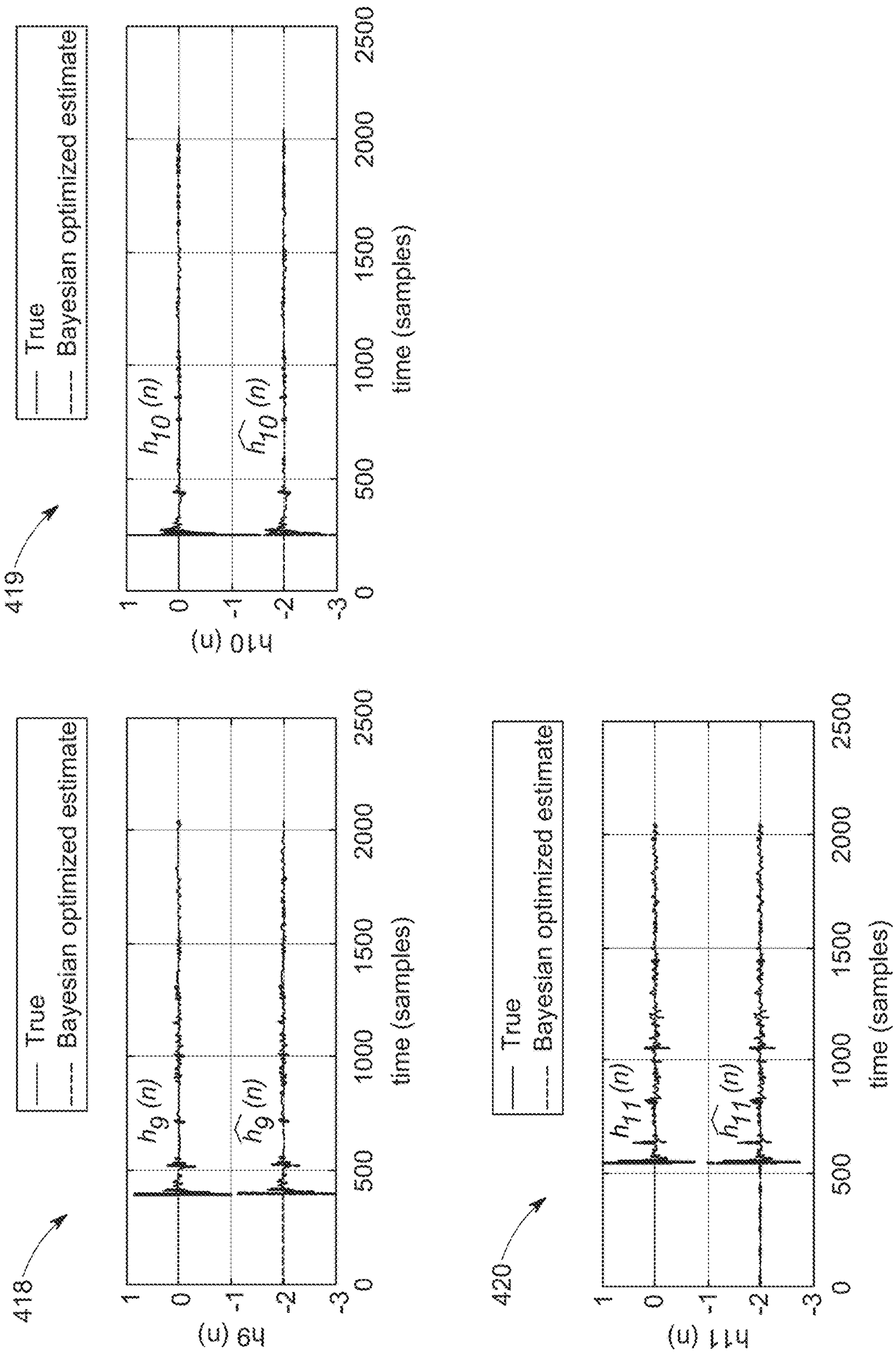

FIG. 4A illustrates example plots 410-420 comparing a second test set comprising a second random combination of true impulse responses against estimated impulse responses determined based on an 11-channel log-sweep stimuli with Bayesian optimized (in the frequency domain) stimuli parameters, in one or more embodiments. A horizontal axis of each plot 410-420 represents time in seconds. A vertical axis of each plot 410-420 represents amplitude. In one embodiment, the loudspeaker-room equalization system 200, via the simultaneous deconvolution engine 230, utilizes the 11-channel log-sweep stimuli with the Bayesian optimized (in the frequency domain) stimuli parameters to simultaneously extract 11 estimated impulse responses $\hat{h}_1(n)$, $\hat{h}_2(n)$, . . . , and $\hat{h}_{11}(n)$. For clarity, the 11 estimated impulse responses $\hat{h}_1(n)$, $\hat{h}_2(n)$, . . . , and $\hat{h}_{11}(n)$ are offset/shifted along the vertical axis.

Plot 410 compares a true impulse response $h_1(n)$ against the estimated impulse response $\hat{h}_1(n)$ of a first loudspeaker channel, plot 411 compares a true impulse response $h_2(n)$ against the estimated impulse response $\hat{h}_2(n)$ of a second loudspeaker channel, plot 412 compares a true impulse response $h_3(n)$ against the estimated impulse response $\hat{h}_3(n)$ of a third loudspeaker channel, plot 413 compares a true impulse response $h_4(n)$ against the estimated impulse response $\hat{h}_4(n)$ of a fourth loudspeaker channel, plot 414 compares a true impulse response $h_5(n)$ against the estimated impulse response $\hat{h}_5(n)$ of a fifth loudspeaker channel, plot 415 compares a true impulse response $h_6(n)$ against the estimated impulse response $\hat{h}_6(n)$ of a sixth loudspeaker channel, plot 416 compares a true impulse response $h_7(n)$ against the estimated impulse response $\hat{h}_7(n)$ of a seventh loudspeaker channel, plot 417 compares a true impulse response $h_8(n)$ against the estimated impulse response $\hat{h}_8(n)$ of an eighth loudspeaker channel, plot 418 compares a true impulse response $h_9(n)$ against the estimated impulse response $\hat{h}_9(n)$ of a ninth loudspeaker channel, plot 419 compares a true impulse response $h_{10}(n)$ against the estimated impulse response $\hat{h}_{10}(n)$ of a tenth loudspeaker channel, and plot 420 compares a true impulse response $h_{11}(n)$ against the estimated impulse response $\hat{h}_{11}(n)$ of an eleventh loudspeaker channel.

Figure 4B:
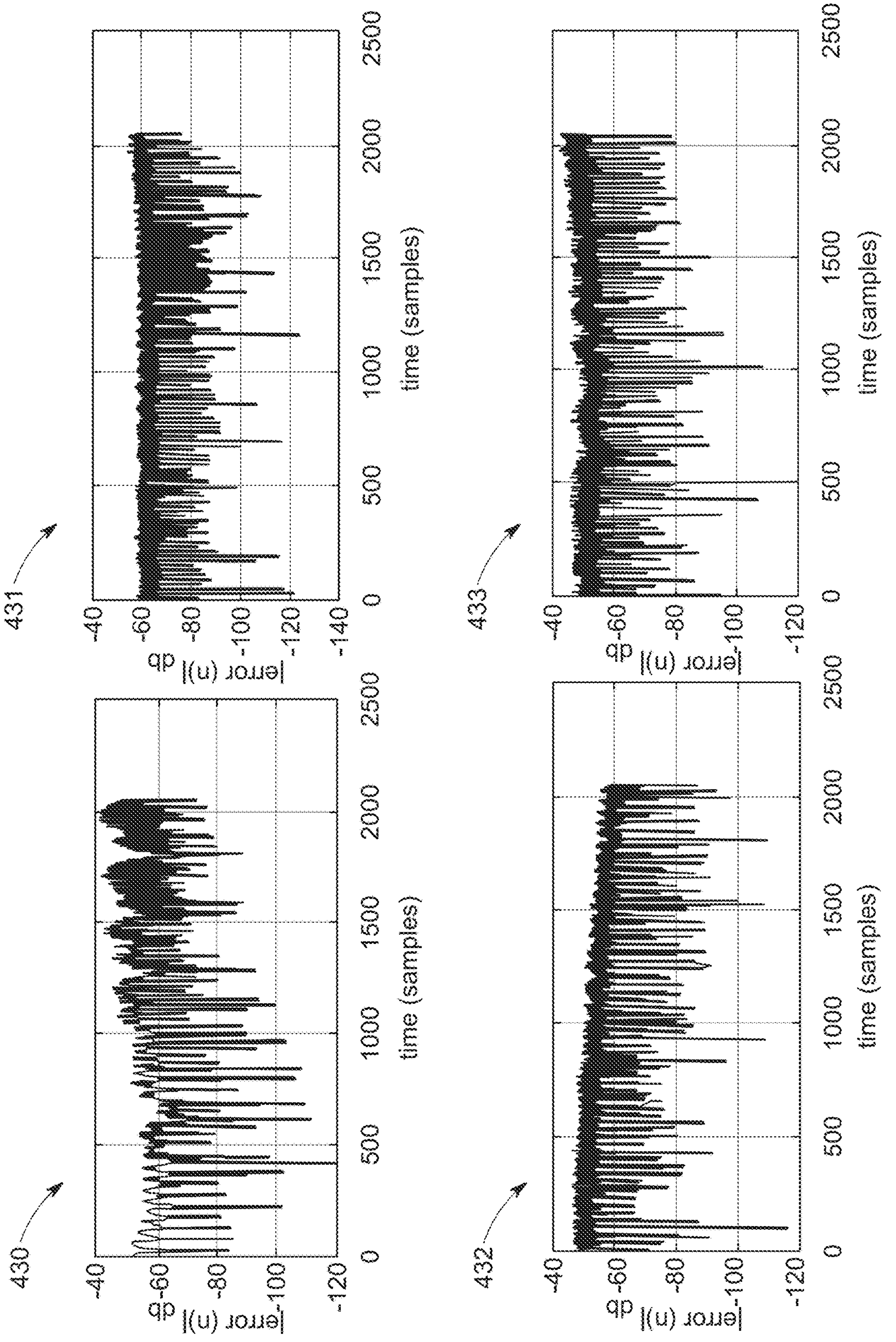
FIG. 4B illustrates example plots of time domain errors between the true impulse responses and the estimated impulse responses of FIG. 4A, in one or more embodiments.
Figure 4B:
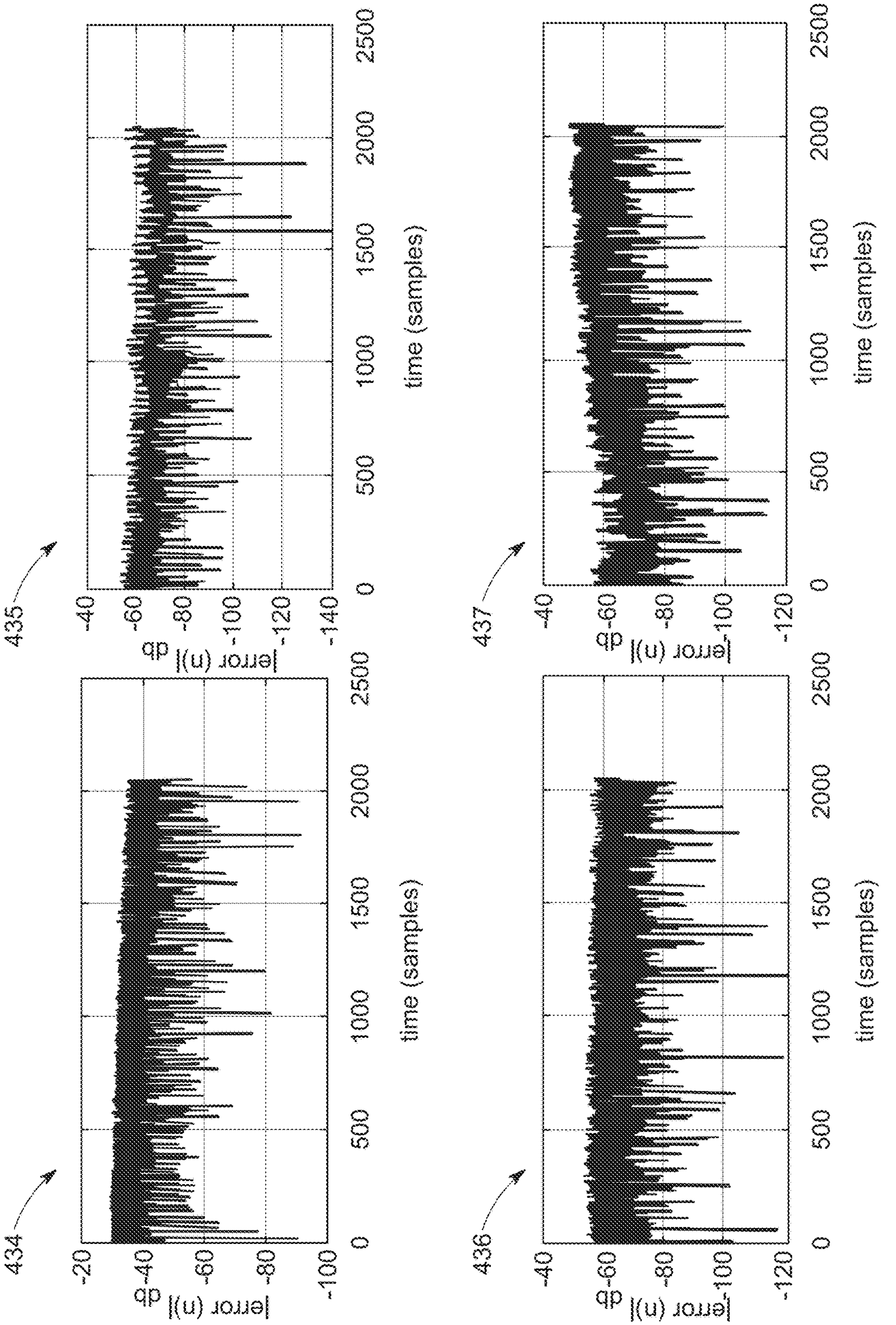
Figure 4B:
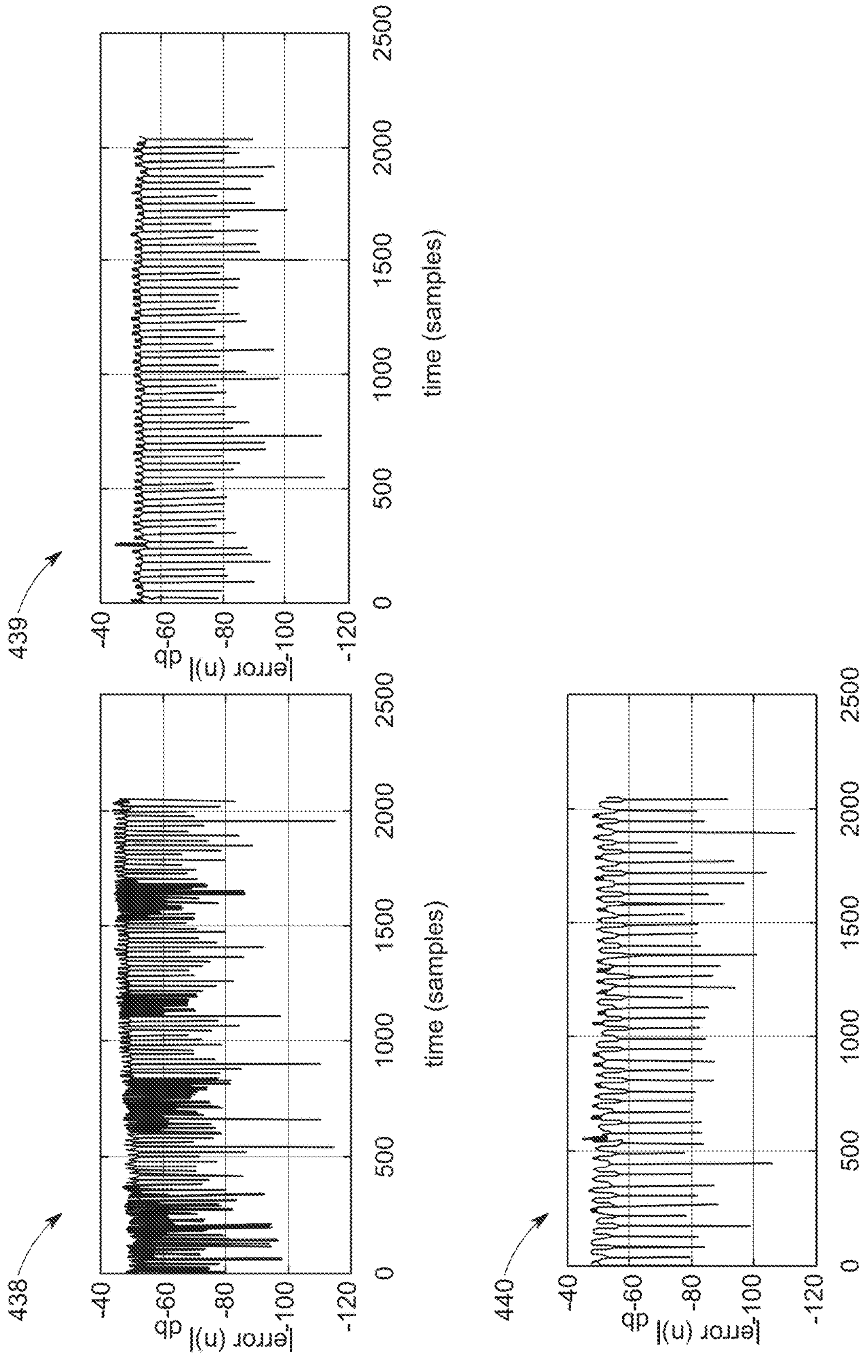

FIG. 4B illustrates example plots 430-440 of time domain errors between the true impulse responses and the estimated impulse responses of FIG. 4A, in one or more embodiments. A horizontal axis of each plot 430-440 represents time in seconds. A vertical axis of each plot 430-440 represents difference. Plot 430 is a first time domain error $e_1(n)$ (i.e., $20\log_{10}|h_1(n)-\widehat{h_1}(n)|$) for the first loudspeaker channel, plot 431 is a second time domain error $e_2(n)$ (i.e., $20\log_{10}|h_2(n)-\widehat{h_2}(n)|$) for the second loudspeaker channel, plot 432 is a third time domain error $e_3(n)$ (i.e., $20\log_{10}|h_3(n)-\widehat{h_3}(n)|$) for the third loudspeaker channel, plot 433 is a fourth time domain error $e_4(n)$ (i.e., $20\log_{10}|h_4(n)-\widehat{h_4}(n)|$) for the fourth loudspeaker channel, plot 434 is a fifth time domain error $e_5(n)$ (i.e., $20\log_{10}|h_5(n)-\widehat{h_5}(n)|$) for the fifth loudspeaker channel, plot 435 is a sixth time domain error $e_6(n)$ (i.e., $20\log_{10}|h_6(n)-\widehat{h_6}(n)|$) for the sixth loudspeaker channel, plot 436 is a seventh time domain error $e_7(n)$ (i.e., $20\log_{10}|h_7(n)-\widehat{h_7}n)|$) for the seventh loudspeaker channel, plot 437 is an eighth time domain error $e_8(n)$ (i.e., $20\log_{10}|h_8(n)-\widehat{h_8}(n)|$) for the eighth loudspeaker channel, plot 438 is a ninth time domain error $e_9(n)$ (i.e., $20\log_{10}|h_9(n)-\widehat{h_9}(n)|$) for the ninth loudspeaker channel, plot 439 is a tenth time domain error $e_{10}(n)$ (i.e., $20\log_{10}|h_{10}(n)-\widehat{h_{10}}(n)|$) for the tenth loudspeaker channel, and plot 440 is an eleventh time domain error $e_{11}(n)$ (i.e., $20\log_{10}|h_{11}(n)-\widehat{h_{11}}(n)|$) for the eleventh loudspeaker channel.

Figure 4C:
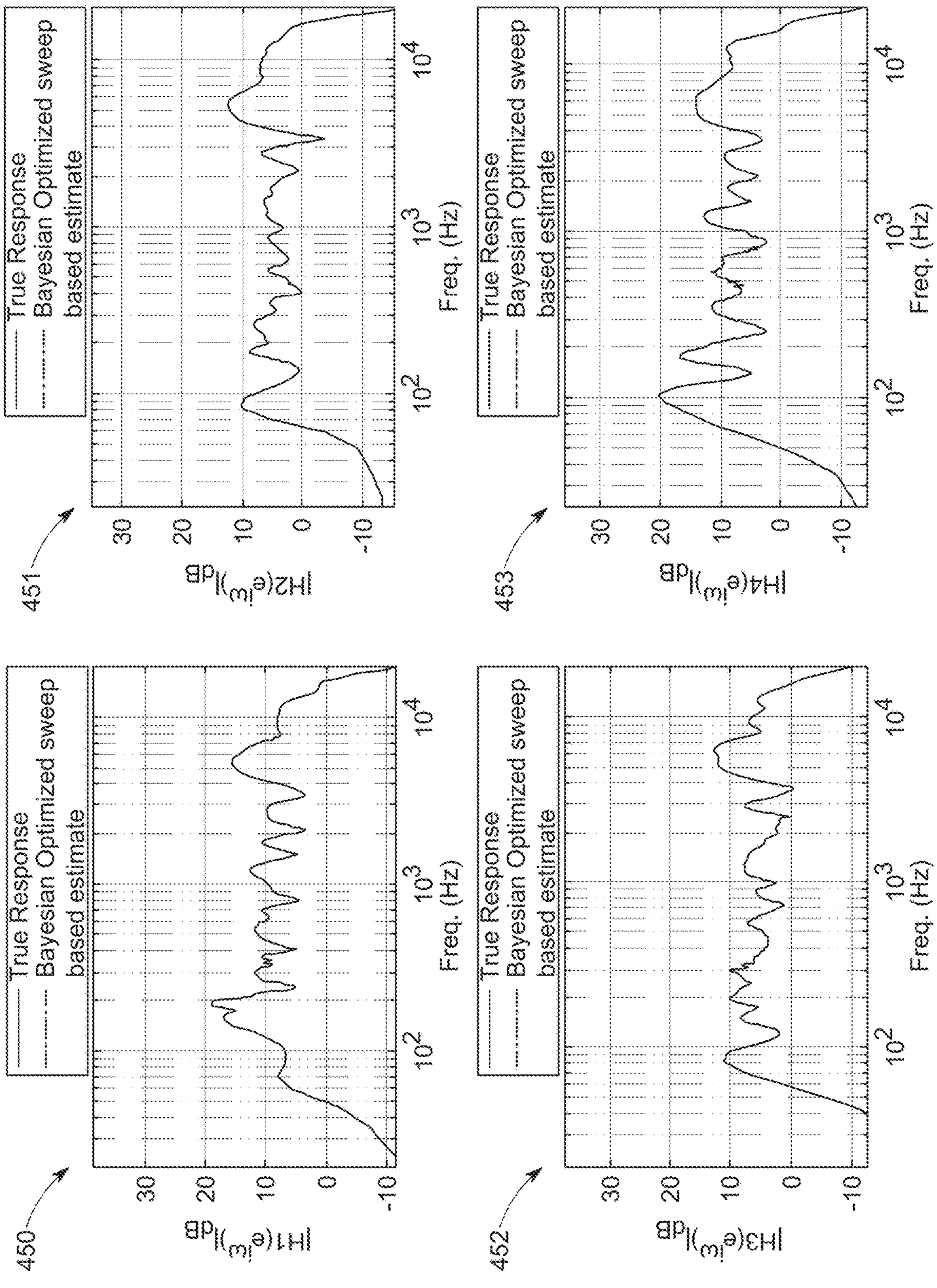
FIG. 4C illustrates example plots of magnitude responses between the true impulse responses and the estimated impulse responses of FIG. 4A, in one or more embodiments.
Figure 4C:
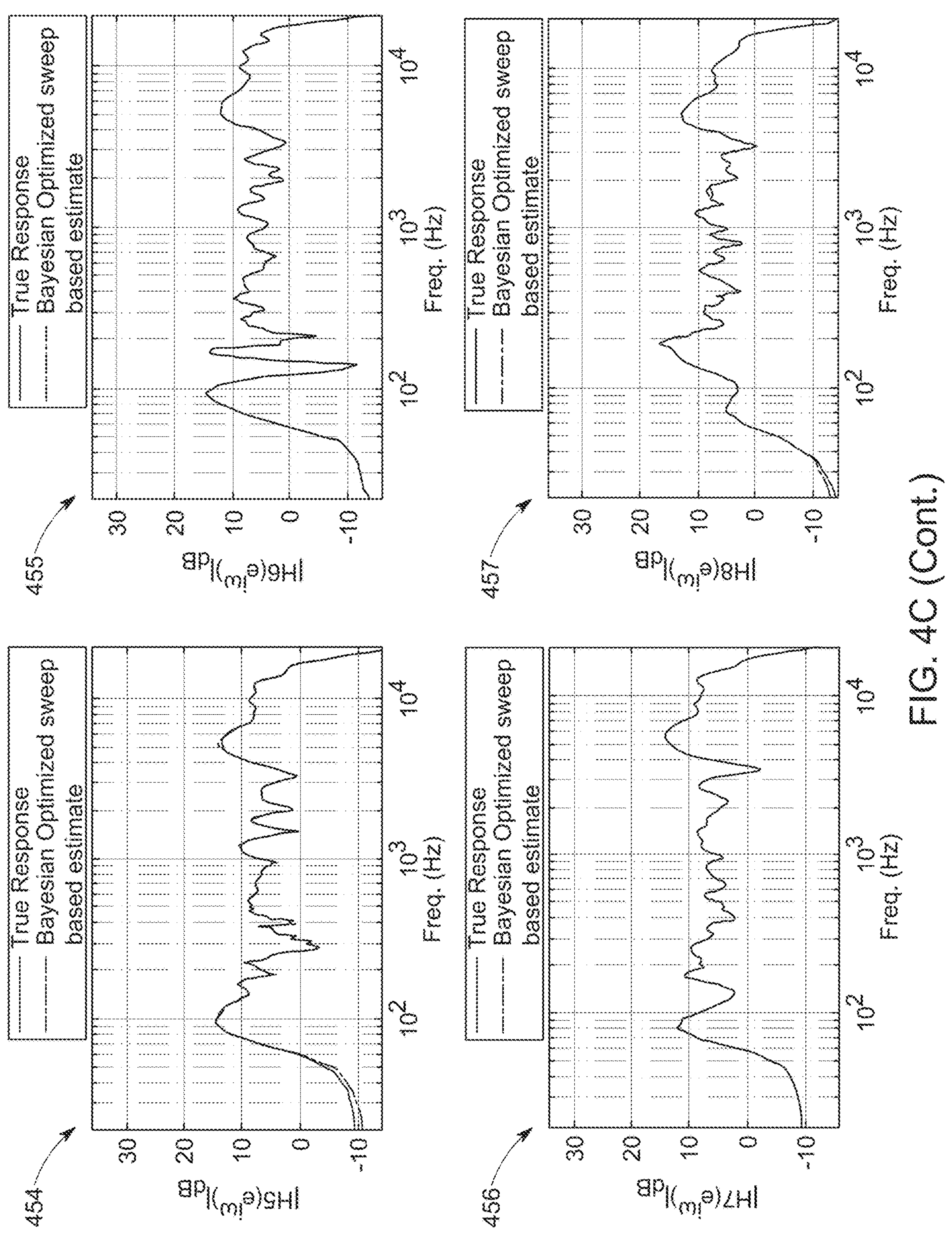
Figure 4C:
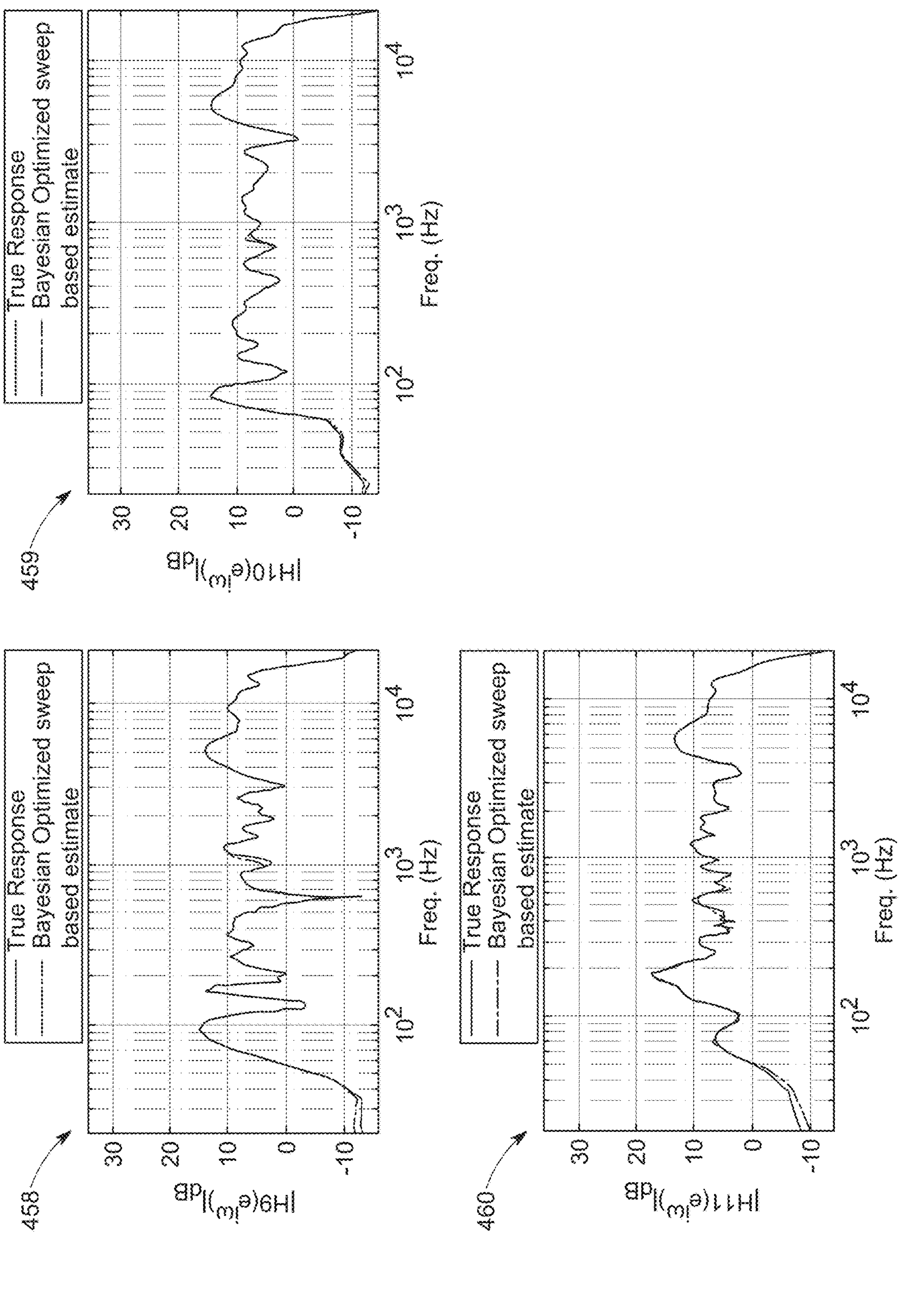

FIG. 4C illustrates example plots 450-460 of magnitude responses between the true impulse responses and the estimated impulse responses of FIG. 4A, in one or more embodiments. A horizontal axis of each plot 450-460 represents frequency in Hz. A vertical axis of each plot 450-460 represents magnitude response in dB.

Plot 450 compares magnitude responses between the true impulse response $h_1(n)$ and the estimated impulse response $\hat{h}_1(n)$ of the first loudspeaker channel, plot 451 compares magnitude responses between the true impulse response $h_2(n)$ and the estimated impulse response $\hat{h}_2(n)$ of the second loudspeaker channel, plot 452 compares magnitude responses between the true impulse response $h_3(n)$ and the estimated impulse response $\hat{h}_3(n)$ of the third loudspeaker channel, plot 453 compares magnitude responses between the true impulse response $h_4(n)$ and the estimated impulse response $\hat{h}_4(n)$ of the fourth loudspeaker channel, plot 454 compares magnitude responses between the true impulse response $h_5(n)$ and the estimated impulse response $\hat{h}_5(n)$ of the fifth loudspeaker channel, plot 455 compares magnitude responses between the true impulse response $h_6(n)$ and the estimated impulse response $\hat{h}_6(n)$ of the sixth loudspeaker channel, plot 456 compares magnitude responses between the true impulse response $h_7(n)$ and the estimated impulse response $\hat{h}_7(n)$ of the seventh loudspeaker channel, plot 457 compares magnitude responses between the true impulse response $h_8(n)$ and the estimated impulse response $\hat{h}_8(n)$ of the eighth loudspeaker channel, plot 458 compares magnitude responses between the true impulse response $h_9(n)$ and the estimated impulse response $\hat{h}_9(n)$ of the ninth loudspeaker channel, plot 459 compares magnitude responses between the true impulse response $h_{10}(n)$ and the estimated impulse response $\hat{h}_{10}(n)$ of the tenth loudspeaker channel, and plot 460 compares magnitude responses between the true impulse response $h_{11}(n)$ and the estimated impulse response $\hat{h}_{11}(n)$ of the eleventh loudspeaker channel.

Figure 5:
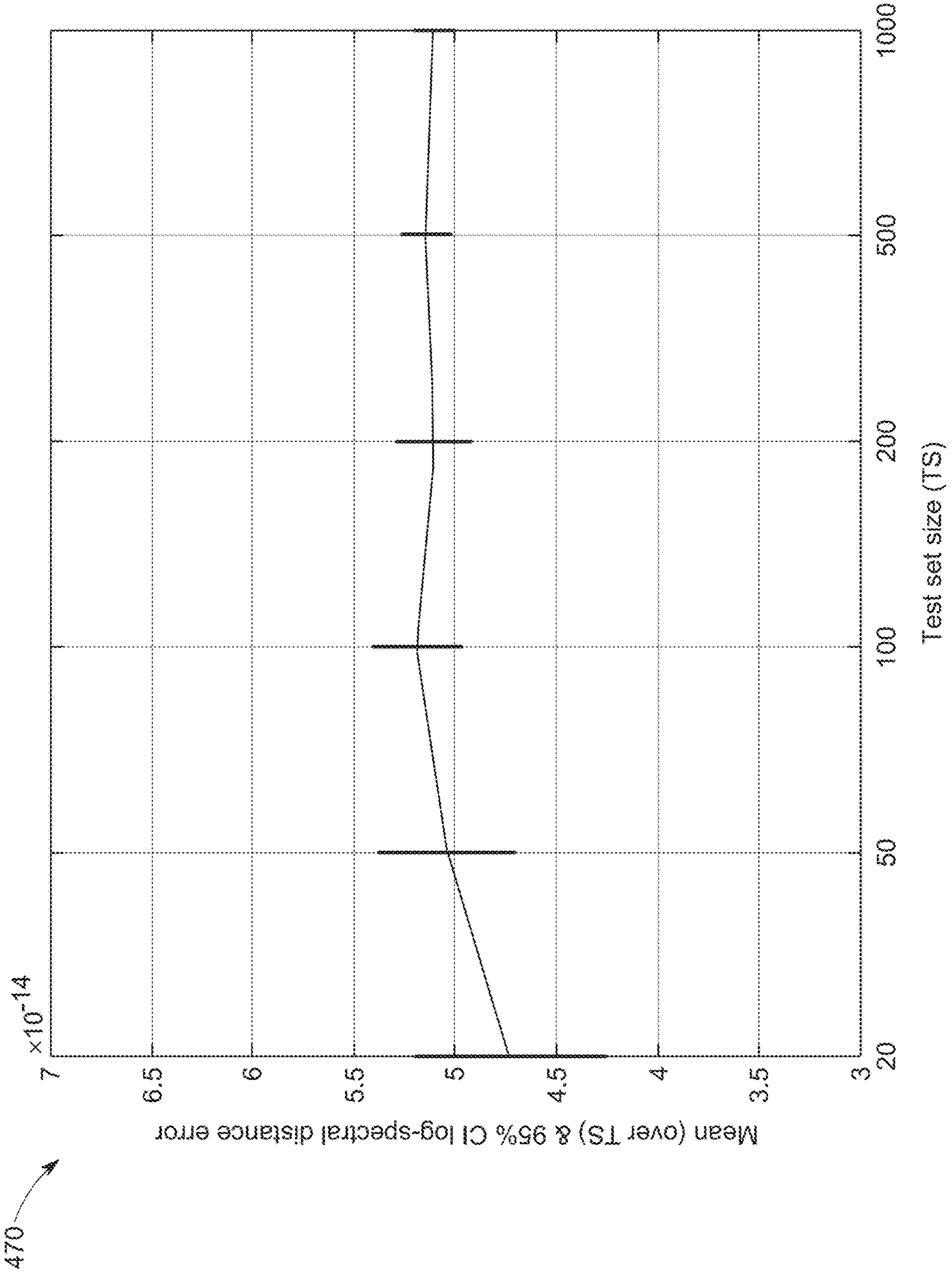
FIG. 5 illustrates an example plot of mean error and 95% confidence interval of mean log-spectral distance error (between true impulse responses and estimated impulse responses of 11 loudspeaker channels) over various sizes of test sets for simulation, in one or more embodiments.

FIG. 5 illustrates an example plot 470 of mean error and 95% confidence interval of mean log-spectral distance error (between true impulse responses and estimated impulse responses of 11 loudspeaker channels) over various sizes of test sets for simulation, in one or more embodiments. A horizontal axis of the plot 470 represents size of a test set. A vertical axis of the plot 470 represents mean error and 95% confidence interval. As shown in FIG. 5, robustness of Bayesian optimization in the frequency domain of stimuli parameters of a 11-channel log-sweep stimuli converges to a low error with larger sizes of test sets comprising random combinations of 11-channel loudspeaker-room impulse responses selected from training data (e.g., MARDY).

Let $\tau_{conven}$ generally denote measurement time (i.e., an amount of time required to measure loudspeaker-room impulse responses) in a first conventional approach for loudspeaker-room equalization that involves sequential measurements of loudspeaker-room impulse responses. Measurement time $\tau_{conven}$ is expressed in accordance with equation (16) provided below:

$$\tau_{conven}=NL_{avg}T_m+(N-1)T_t \quad (16),$$

wherein $L_{avg}$ is a number of averages per listening position.

Let $\tau_{MESM}$ generally denote measurement time in a second conventional approach for loudspeaker-room equalization that involves a multiple exponential sweep method (MESM) for fast measurement of head-related transfer functions, as described in the non-patent literature titled "Multiple Exponential Sweep Method for Fast Measurement of Head-related Transfer Functions" by P. Majdak et al., published in the Journal of the Audio Engineering Society, July 2007, 55:623-637. Measurement time $\tau_{MESM}$ is expressed in accordance with equation (17) provided below:

$$\tau_{MESM} \geq L_{avg}(T_{log}+NT_r) \quad (17),$$

wherein $T_{log}$ is a duration of a log-sweep stimuli, and $T_r$ is a time for recording a measurement of sound arriving at a listening position.

Let $\tau_{simult}$ generally denote measurement time in an embodiment of the invention for loudspeaker-room equalization with Bayesian optimization for simultaneous deconvolution of loudspeaker-room impulse responses, let $F_T^{conven}$ generally denote a factor representing time savings ("time-improvement factor") of the embodiment over the first conventional approach, and let $F_T^{MESM}$ generally denote a time-improvement factor of the embodiment over the second conventional approach. Measurement time $\tau_{simult}$ and time-improvement factors $F_T^{conven}$ and $F_T^{MESM}$ are expressed in accordance with equations (18)-(20), provided below:

$$\tau_{simult} = L_{avg} T_m, \quad (18)$$

$$F_T^{conven} = \frac{NL_{avg}T_m + (N-1)T_t}{L_{avg}T_m} - 1, \quad (19)$$

wherein $F_T^{conven} \in [0, \infty)$ with 0 indicating no improvement in measurement time and higher values indicating progressively improved performance (i.e., higher time-improvement factor), and $$F_T^{MESM} = \frac{(T_{log} + NT_r)}{T_m} - 1, \quad (20)$$

wherein $F_T^{MESM} \in [0, \infty)$ with 0 indicating no improvement in measurement time and higher values indicating progressively improved performance (i.e., higher time-improvement factor).

As shown in equations (16)-(20), unlike conventional approaches for loudspeaker-room equalization, loudspeaker-room equalization with Bayesian optimization for simultaneous deconvolution of loudspeaker-room impulse responses reduces measurement time and increases time-improvement factors.

Figure 6B:
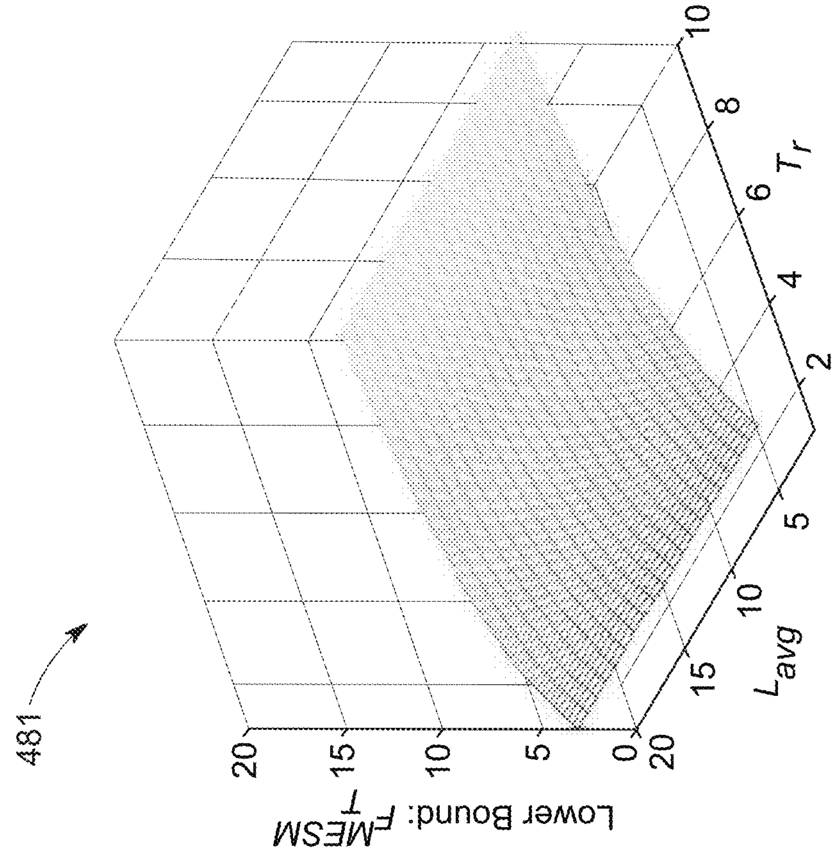
FIG. 6B illustrates an example plot of a time-improvement factor $F_T^{MESM}$ if $T_{log}$=2.7738, in one or more embodiments.
Figure 6A:
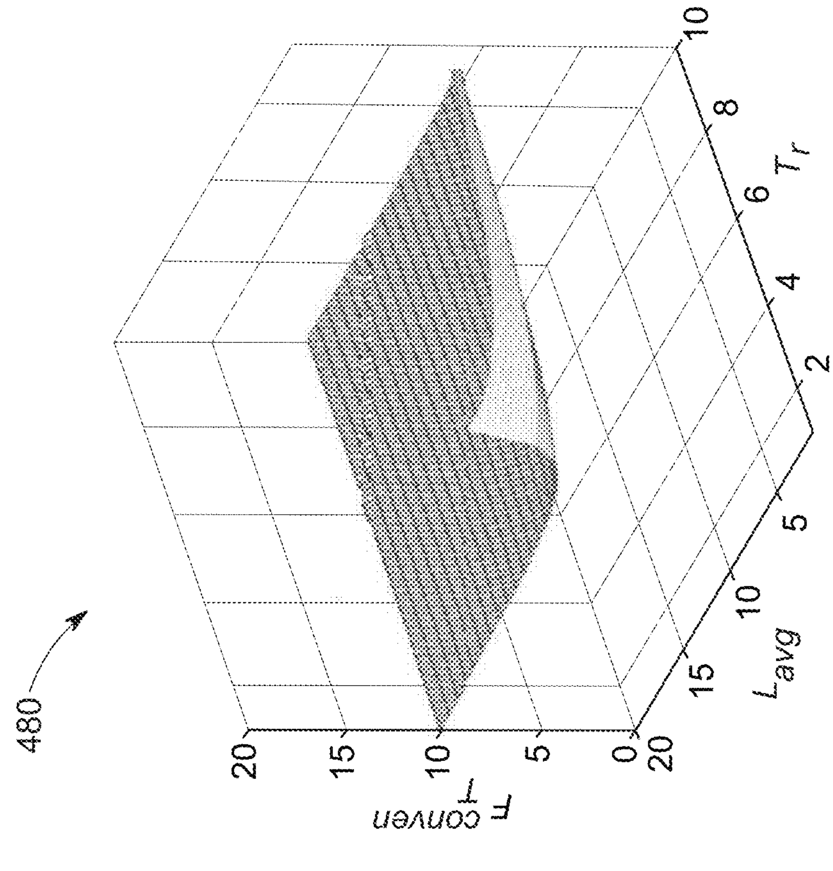
FIG. 6A illustrates an example plot of a time-improvement factor $F_T^{conven}$ if $T_{log}$=2.7738, in one or more embodiments.

FIG. 6A illustrates an example plot 480 of a time-improvement factor $F_T^{conven}$ if $T_{log}$=2.7738, in one or more embodiments. A first horizontal axis of the plot 480 represents $L_{avg}$. A second horizontal axis of the plot 480 represents $T_r$ in seconds. A vertical axis of the plot 480 represents the time-improvement factor $F_T^{conven}$.

FIG. 6B illustrates an example plot 481 of a time-improvement factor $F_T^{MESM}$ if $T_{log}$=2.7738, in one or more embodiments. A first horizontal axis of the plot 481 represents $L_{avg}$. A second horizontal axis of the plot 481 represents $T_r$ in seconds. A vertical axis of the plot 481 represents the time-improvement factor $F_T^{MESM}$.

Figure 7A:
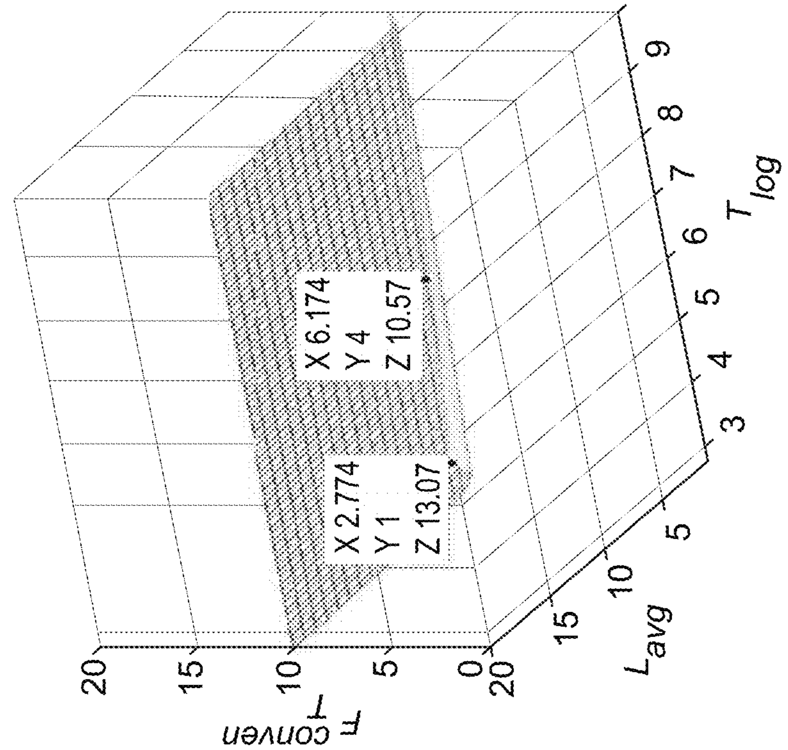
FIG. 7A illustrates an example plot of a time-improvement factor $F_T^{conven}$ if $T_r$=7 seconds, in one or more embodiments.

FIG. 7A illustrates an example plot 490 of a time-improvement factor $F_T^{conven}$ if $T_r$=7 seconds, in one or more embodiments. A first horizontal axis of the plot 490 represents $L_{avg}$. A second horizontal axis of the plot 490 represents $T_{log}$ in seconds. A vertical axis of the plot 490 represents the time-improvement factor $F_T^{conven}$.

Figure 7B:
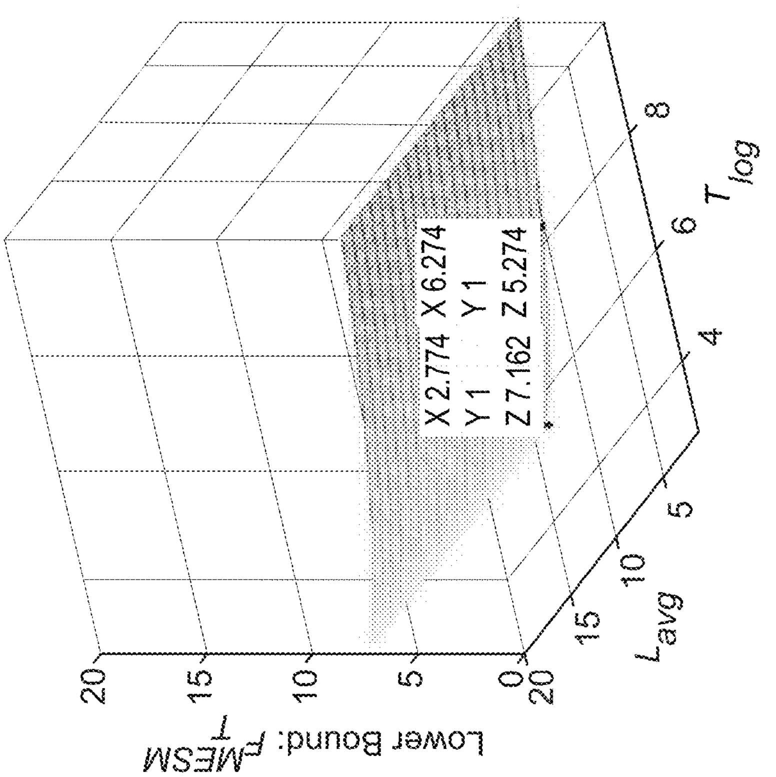
FIG. 7B illustrates an example plot 491 of a time-improvement factor $F_T^{MESM}$ if $T_r$=7 seconds, in one or more embodiments.

FIG. 7B illustrates an example plot 491 of a time-improvement factor $F_T^{MESM}$ if $T_y$=7 seconds, in one or more embodiments. A first horizontal axis of the plot 491 represents $L_{avg}$. A second horizontal axis of the plot 491 represents $T_{log}$ in seconds. A vertical axis of the plot 491 represents the time-improvement factor $F_T^{MESM}$.

As shown in FIGS. 6A-7B, the larger a time-improvement factor $F_T^{conven}$ $F_T^{MESM}$, the larger the amount of time savings realized via loudspeaker-room equalization with Bayesian optimization for simultaneous deconvolution of loudspeaker-room impulse responses (over conventional approaches for loudspeaker-room equalization).

Figure 8:
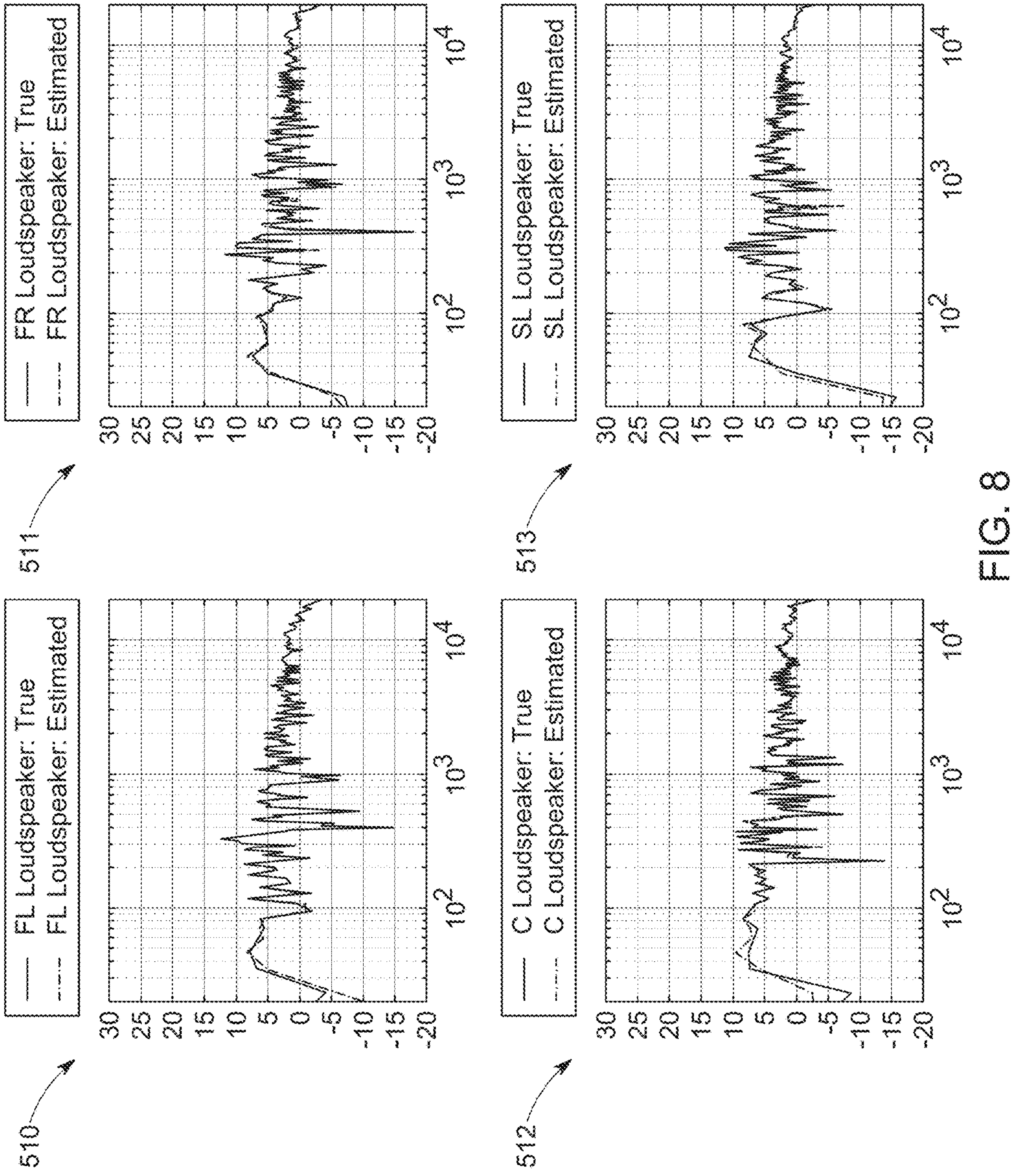
FIG. 8 illustrates example plots of 1⁄12-octave smoothed magnitude responses between true impulse responses and estimated impulse responses of 11 loudspeaker channels provided by 11 distinct loudspeakers arranged in a 7.1.4 loudspeaker setup, in one or more embodiments.
Figure 8:
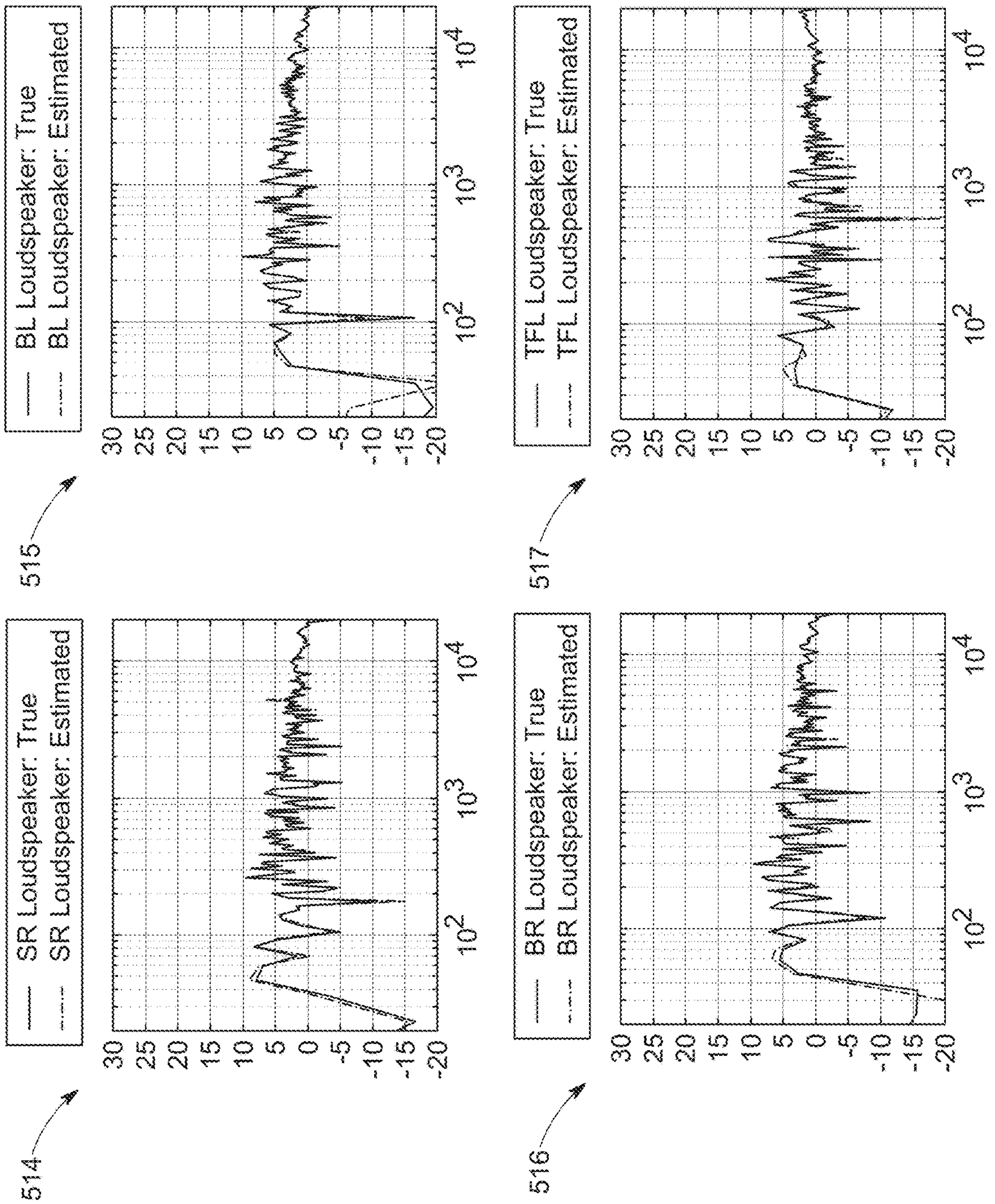
Figure 8:
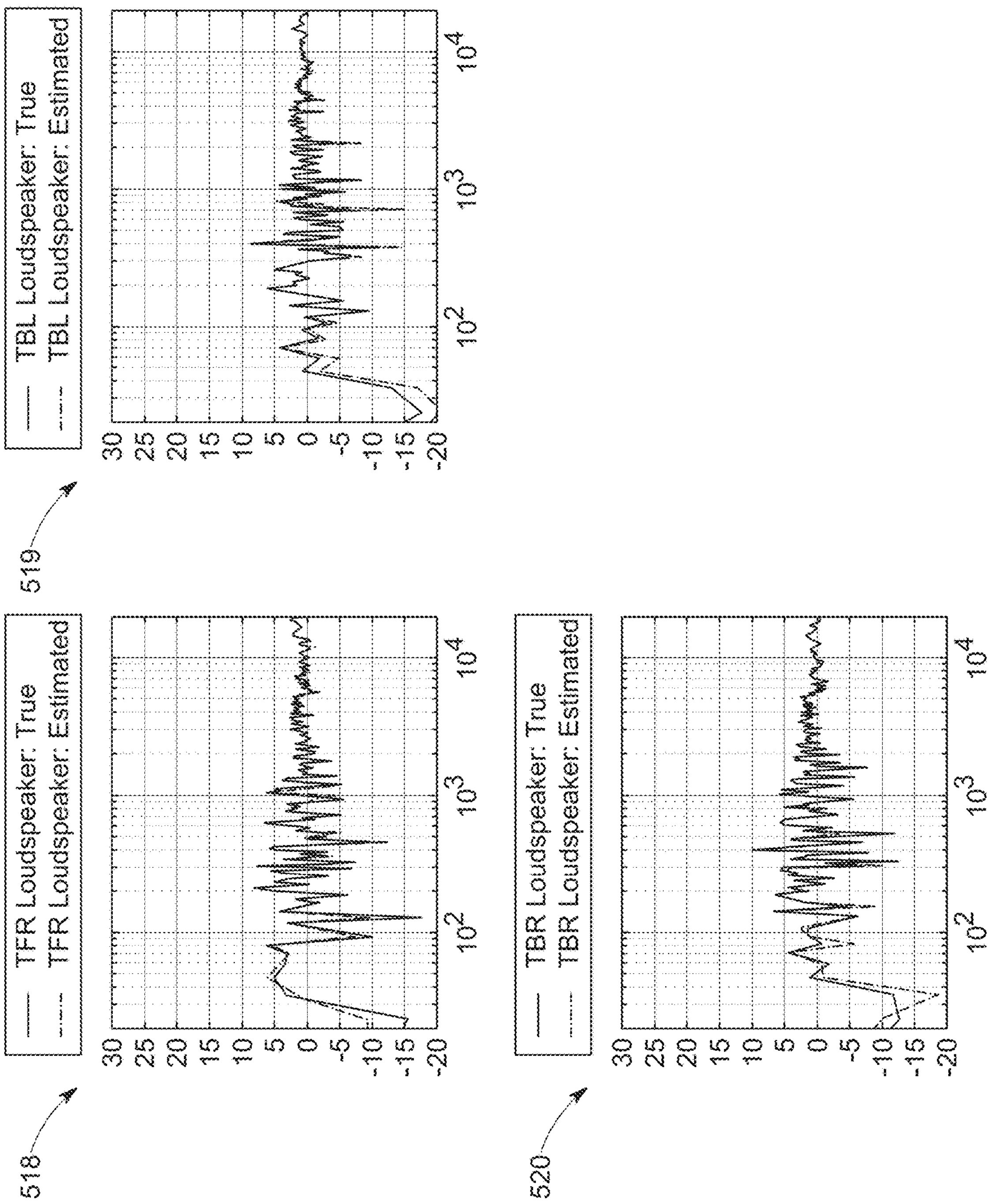

FIG. 8 illustrates example plots 510-520 of 1/12-octave smoothed magnitude responses between true impulse responses and estimated impulse responses of 11 loudspeaker channels provided by 11 distinct loudspeakers arranged in a 7.1.4 loudspeaker setup, in one or more embodiments. A horizontal axis of each plot 510-520 represents frequency in Hz. A vertical axis of each plot 510-520 represents magnitude response in dB.

Plot 510 compares magnitude responses between a true impulse response $h_1(n)$ and an estimated impulse response $\hat{h}_1(n)$ of a first loudspeaker at a front left of a room ("FL Loudspeaker"), plot 511 compares magnitude responses between a true impulse response $h_2(n)$ and an estimated impulse response $\hat{h}_2(n)$ of a second loudspeaker at a front right of the room ("FR Loudspeaker"), plot 512 compares magnitude responses between a true impulse response $h_3(n)$ and an estimated impulse response $\hat{h}_3(n)$ of a third loudspeaker at a front center of the room ("C Loudspeaker"), plot 513 compares magnitude responses between a true impulse response $h_4(n)$ and an estimated impulse response $\hat{h}_4(n)$ of a fourth loudspeaker at a side left of the room ("SL Loudspeaker"), plot 514 compares magnitude responses between a true impulse response $h_5(n)$ and an estimated impulse response $\hat{h}_5(n)$ of a fifth loudspeaker at a side right of the room ("SR Loudspeaker"), plot 515 compares magnitude responses between a true impulse response $h_6(n)$ and an estimated impulse response $\hat{h}_6(n)$ of a sixth loudspeaker at a back left of the room ("BL Loudspeaker"), plot 516 compares magnitude responses between a true impulse response $h_7(n)$ and an estimated impulse response $\hat{h}_7(n)$ of a seventh loudspeaker at a back right of the room ("BR Loudspeaker"), plot 517 compares magnitude responses between a true impulse response $h_8(n)$ and an estimated impulse response $\hat{h}_8(n)$ of an eighth loudspeaker at a top front left of the room ("TFL Loudspeaker"), plot 518 compares magnitude responses between a true impulse response $h_9(n)$ and an estimated impulse response $\hat{h}_9(n)$ of a ninth loudspeaker at a top front right of the room ("TFR Loudspeaker"), plot 519 compares magnitude responses between a true impulse response $h_{10}(n)$ and an estimated impulse response $\hat{h}_{10}(n)$ of a tenth loudspeaker at a top back left of the room ("TBL Loudspeaker"), and plot 520 compares magnitude responses between a true impulse response $h_{11}(n)$ and an estimated impulse response $\hat{h}_{11}(n)$ of an eleventh loudspeaker at a top back right of the room ("TBR Loudspeaker").

Figure 9:
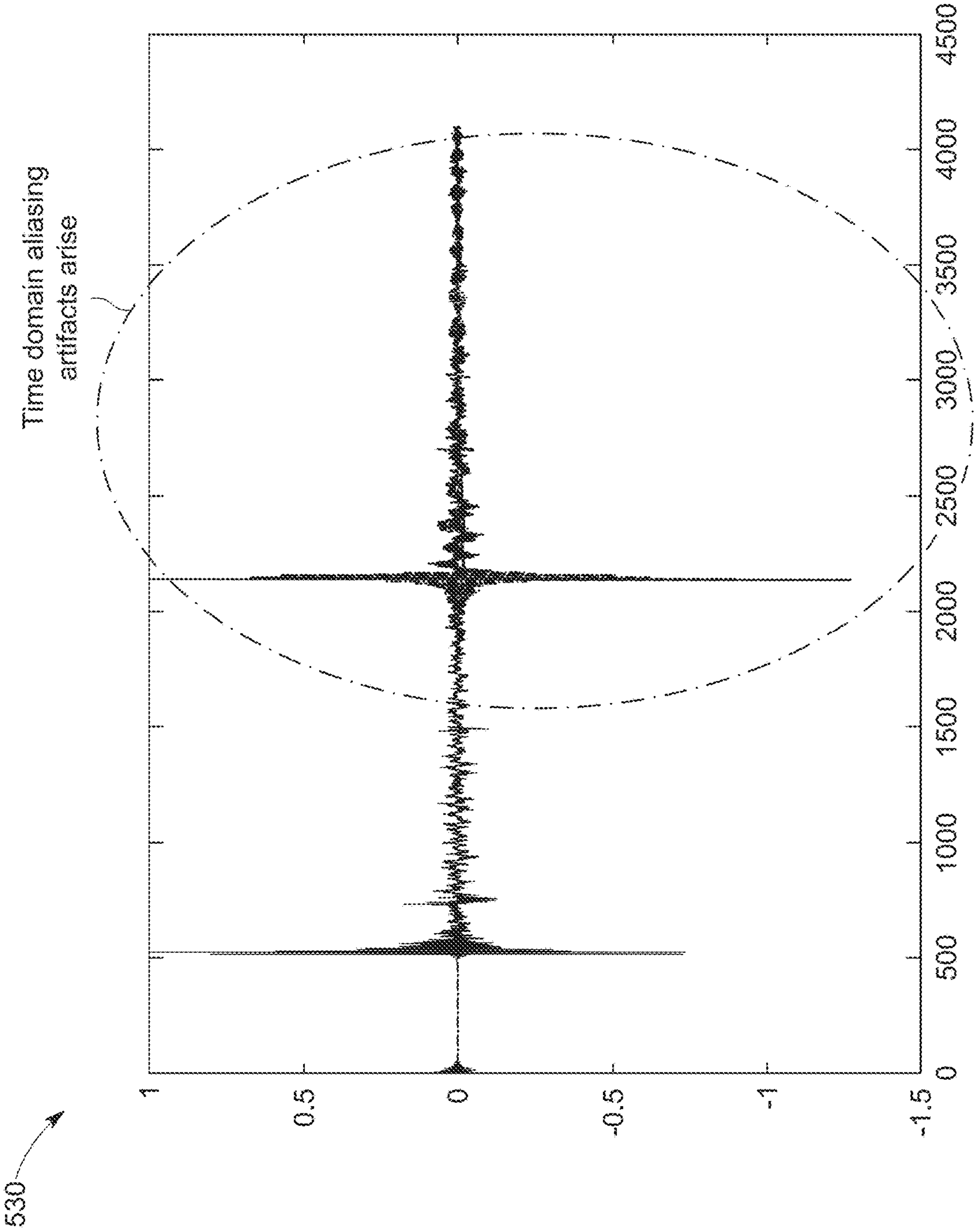
FIG. 9 illustrates an example plot of a time domain error between a true impulse response and an estimated impulse response determined based on a log-sweep stimuli with Bayesian optimized (in the frequency domain) stimuli parameters, in one or more embodiments.

FIG. 9 illustrates an example plot 530 of a time domain error between a true impulse response and an estimated impulse response determined based on a log-sweep stimuli with Bayesian optimized (in the frequency domain) stimuli parameters, in one or more embodiments. A horizontal axis of the plot 530 represents time in seconds. A vertical axis of the plot 530 represents difference. While magnitude responses between the true impulse response and the estimated impulse response may substantially match (see FIG. 8), time domain aliasing artifacts start to arise around 1500 samples, as shown in FIG. 9. Such time domain aliasing artifacts may be eliminated by optimizing the stimuli parameters using Bayesian optimization in the time domain (e.g., Table 3), instead of Bayesian optimization in the frequency domain.

Figure 10A:
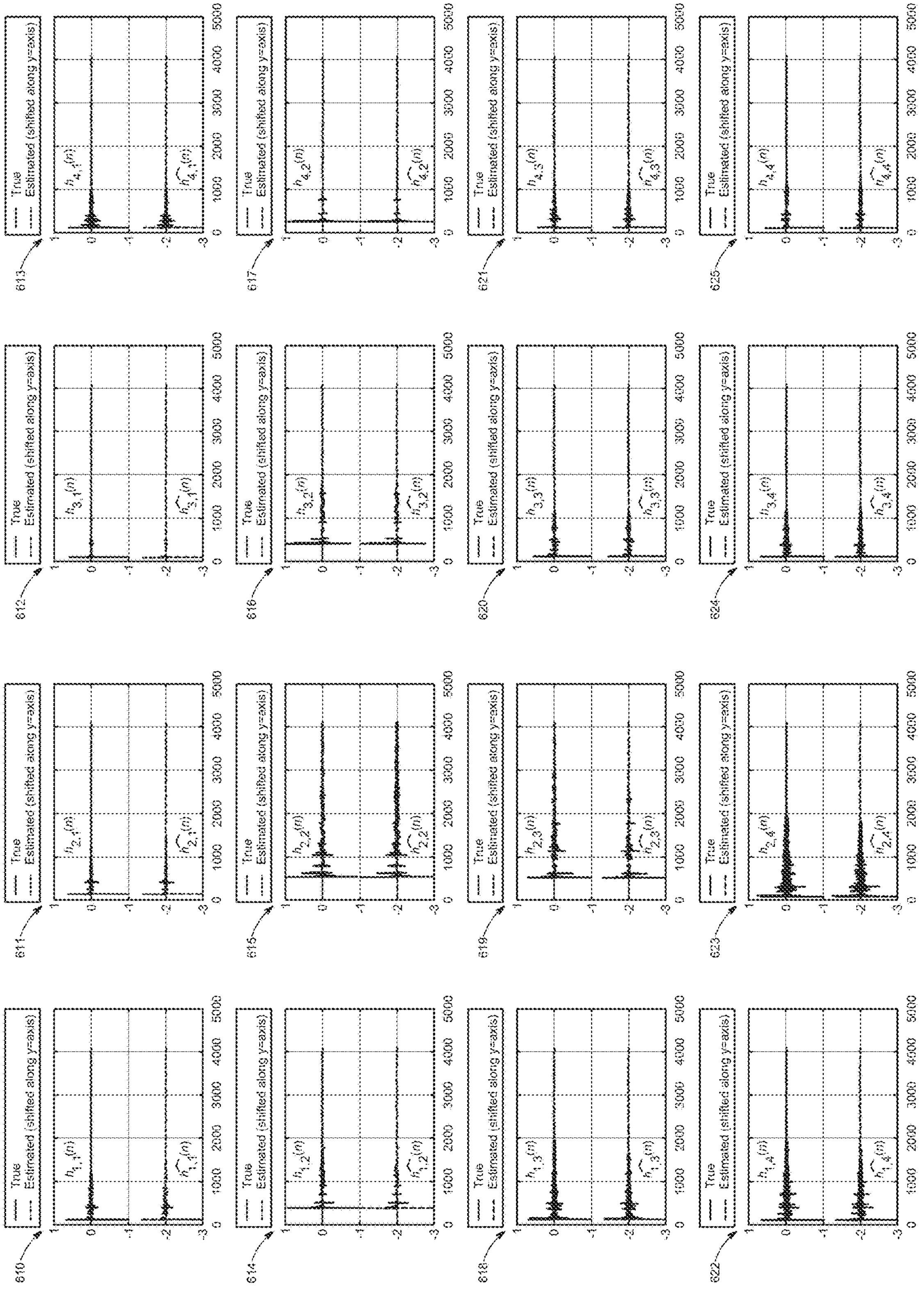
FIG. 10A illustrates example plots comparing a test set comprising a random combination of true impulse responses against estimated impulse responses determined based on a log-sweep stimuli with Bayesian optimized (in the time domain) stimuli parameters, in one or more embodiments.
Figure 10B:
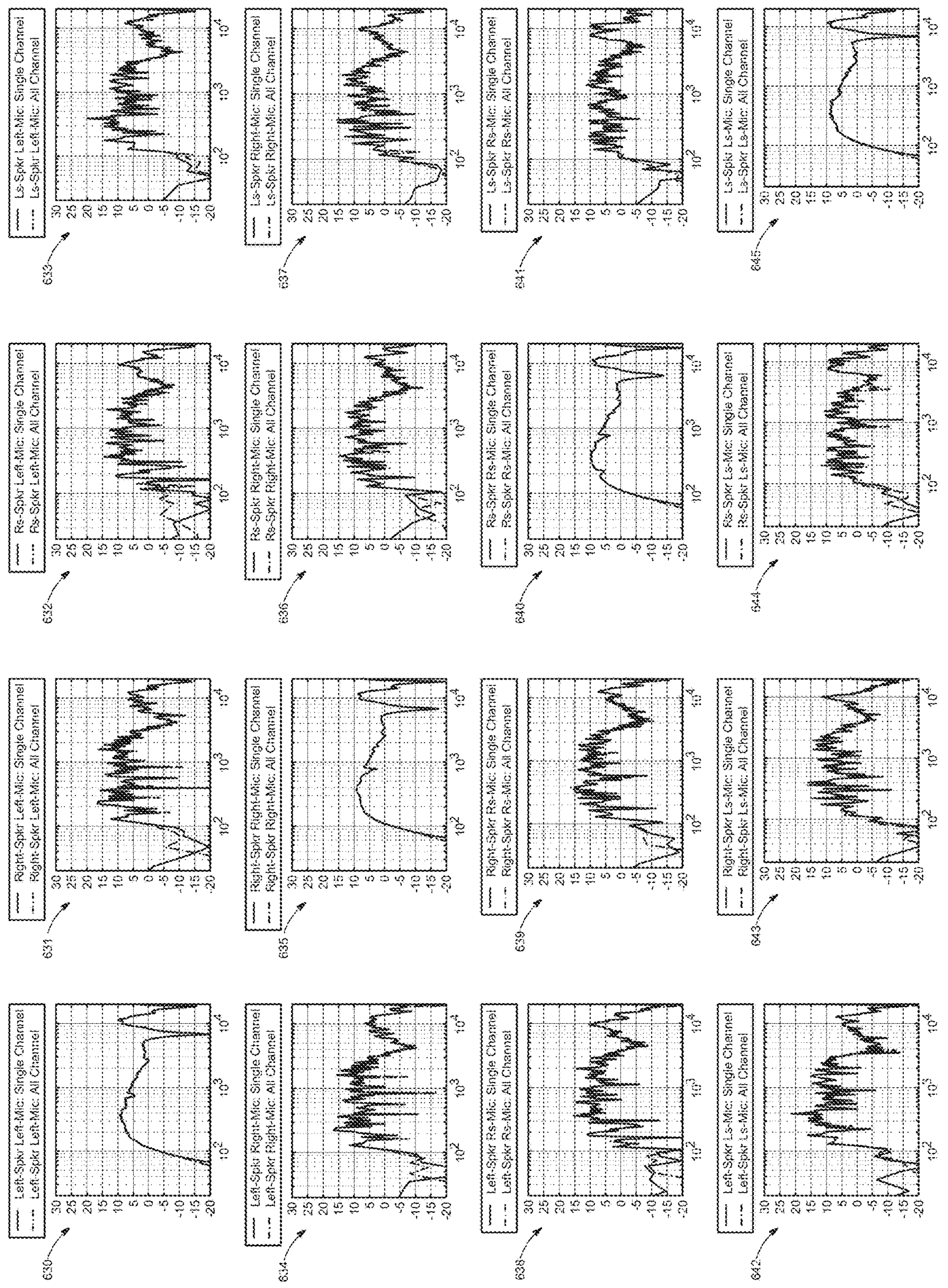
FIG. 10B illustrates example plots of magnitude responses between the true impulse responses and the estimated impulse responses of FIG. 10A, in one or more embodiments.

FIGS. 10A-10B compare true impulse responses against estimated impulse responses of 4 distinct loudspeakers within a room with 4 measurement microphones ("4-microphone setup"). FIG. 10A illustrates example plots 610-625 comparing a test set comprising a random combination of true impulse responses against estimated impulse responses determined based on a log-sweep stimuli with Bayesian optimized (in the time domain) stimuli parameters, in one or more embodiments. A horizontal axis of each plot 610-625 represents time in seconds. A vertical axis of each plot 610-625 represents amplitude. In one embodiment, the loudspeaker-room equalization system 200, via the simultaneous deconvolution engine 230, utilizes the log-sweep stimuli with the Bayesian optimized (in the time domain) stimuli parameters to simultaneously extract 16 estimated impulse responses $\hat{h}_{1,1}(n)$, $\hat{h}_{1,2}(n)$, $\hat{h}_{1,3}(n)$, $\hat{h}_{1,4}(n)$, $\hat{h}_{2,1}(n)$, . . . , and $\hat{h}_{4,4}(n)$. For clarity, the 16 estimated impulse responses $\hat{h}_{1,1}(n)$, $\hat{h}_{1,2}(n)$, $\hat{h}_{1,3}(n)$, $\hat{h}_{1,4}(n)$, $\hat{h}_{2,1}(n)$, . . . , and $\hat{h}_{4,4}(n)$ are offset/shifted along the vertical axis.

For measurements recorded with a first microphone of the 4-microphone setup, plot 610 compares a true impulse response $h_{1,1}(n)$ against the estimated impulse response $\hat{h}_{1,1}(n)$ of a first loudspeaker, plot 611 compares a true impulse response $h_{2,1}(n)$ against the estimated impulse response $\hat{h}_{2,1}(n)$ of a second loudspeaker, plot 612 compares a true impulse response $h_{3,1}(n)$ against the estimated impulse response $\hat{h}_{3,1}(n)$ of a third loudspeaker measured, and plot 613 compares a true impulse response $h_{4,1}(n)$ against the estimated impulse response $\hat{h}_{4,1}(n)$ of a fourth loudspeaker.

For measurements recorded with a second microphone of the 4-microphone setup, plot 614 compares a true impulse response $h_{1,2}(n)$ against the estimated impulse response $\hat{h}_{1,2}(n)$ of the first loudspeaker, plot 615 compares a true impulse response $h_{2,2}(n)$ against the estimated impulse response $\hat{h}_{2,2}(n)$ of the second loudspeaker channel, plot 616 compares a true impulse response $h_{3,2}(n)$ against the estimated impulse response $\hat{h}_{3,2}(n)$ of the third loudspeaker, and plot 617 compares a true impulse response $h_{4,2}(n)$ against the estimated impulse response $\hat{h}_{4,2}(n)$ of the fourth loudspeaker channel.

For measurements recorded with a third microphone of the 4-microphone setup, plot 618 compares a true impulse response $h_{1,3}(n)$ against the estimated impulse response $\hat{h}_{1,3}(n)$ of the first loudspeaker, plot 619 compares a true impulse response $h_{2,3}(n)$ against the estimated impulse response $\hat{h}_{2,3}(n)$ of the second loudspeaker channel, plot 620 compares a true impulse response $h_{3,3}(n)$ against the estimated impulse response $\hat{h}_{3,3}(n)$ of the third loudspeaker, and plot 621 compares a true impulse response $h_{4,3}(n)$ against the estimated impulse response $\hat{h}_{4,3}$ (n) of the fourth loudspeaker channel.

For measurements recorded with a fourth microphone of the 4-microphone setup, plot 622 compares a true impulse response $h_{1,4}(n)$ against the estimated impulse response $\hat{h}_{1,4}(n)$ of the first loudspeaker, plot 623 compares a true impulse response $h_{2,4}(n)$ against the estimated impulse response $\hat{h}_{2,4}(n)$ of the second loudspeaker channel, plot 624 compares a true impulse response $h_{3,4}(n)$ against the estimated impulse response $\hat{h}_{3,4}(n)$ of the third loudspeaker, and plot 625 compares a true impulse response $h_{4,4}(n)$ against the estimated impulse response $\hat{h}_{4,4}(n)$ of the fourth loudspeaker channel.

FIG. 10B illustrates example plots 630-645 of magnitude responses between the true impulse responses and the estimated impulse responses of FIG. 10A, in one or more embodiments. A horizontal axis of each plot 630-645 represents frequency in Hz. A vertical axis of each plot 630-645 represents magnitude response in dB.

For measurements recorded with the first microphone of the 4-microphone setup, plot 630 compares magnitude responses between the true impulse response $h_{1,1}(n)$ and the estimated impulse response $\hat{h}_{1,1}(n)$ of the first loudspeaker, plot 631 compares magnitude responses between the true impulse response $h_{2,1}(n)$ and the estimated impulse response $\hat{h}_{2,1}(n)$ of the second loudspeaker, plot 632 compares magnitude responses between the true impulse response $h_{3,1}(n)$ and the estimated impulse response $\hat{h}_{3,1}(n)$ of the third loudspeaker, and plot 633 compares magnitude responses between the true impulse response $h_{4,1}(n)$ and the estimated impulse response $\hat{h}_{4,1}(n)$ of the fourth loudspeaker.

For measurements recorded with the second microphone of the 4-microphone setup, plot 634 compares magnitude responses between the true impulse response $h_{1,2}$ (n) and the estimated impulse response $\hat{h}_{1,2}(n)$ of the first loudspeaker, plot 635 compares magnitude responses between the true impulse response $h_{2,2}(n)$ and the estimated impulse response $\hat{h}_{2,2}(n)$ of the second loudspeaker, plot 636 compares magnitude responses between the true impulse response $h_{3,2}(n)$ and the estimated impulse response $\hat{h}_{3,2}(n)$ of the third loudspeaker, and plot 637 compares magnitude responses between the true impulse response $h_{4,2}(n)$ and the estimated impulse response $\hat{h}_{4,2}(n)$ of the fourth loudspeaker.

For measurements recorded with the third microphone of the 4-microphone setup, plot 638 compares magnitude responses between the true impulse response $h_{1,3}(n)$ and the estimated impulse response $\hat{h}_{1,3}(n)$ of the first loudspeaker, plot 639 compares magnitude responses between the true impulse response $h_{2,3}(n)$ and the estimated impulse response $\hat{h}_{2,3}$ (n) of the second loudspeaker, plot 640 compares magnitude responses between the true impulse response $h_{3,3}(n)$ and the estimated impulse response $\hat{h}_{3,3}$ (n) of the third loudspeaker, and plot 641 compares magnitude responses between the true impulse response $h_{4,3}(n)$ and the estimated impulse response $\hat{h}_{4,3}(n)$ of the fourth loudspeaker.

For measurements recorded with the fourth microphone of the 4-microphone setup, plot 642 compares magnitude responses between the true impulse response $h_{1,4}(n)$ and the estimated impulse response $\hat{h}_{1,4}(n)$ of the first loudspeaker, plot 643 compares magnitude responses between the true impulse response $h_{2,4}(n)$ and the estimated impulse response $\hat{h}_{2,4}(n)$ of the second loudspeaker, plot 644 compares magnitude responses between the true impulse response $h_{3,4}(n)$ and the estimated impulse response $\hat{h}_{3,4}(n)$ of the third loudspeaker, and plot 645 compares magnitude responses between the true impulse response $h_{4,4}(n)$ and the estimated impulse response $\hat{h}_{4,4}(n)$ of the fourth loudspeaker.

Figure 11:
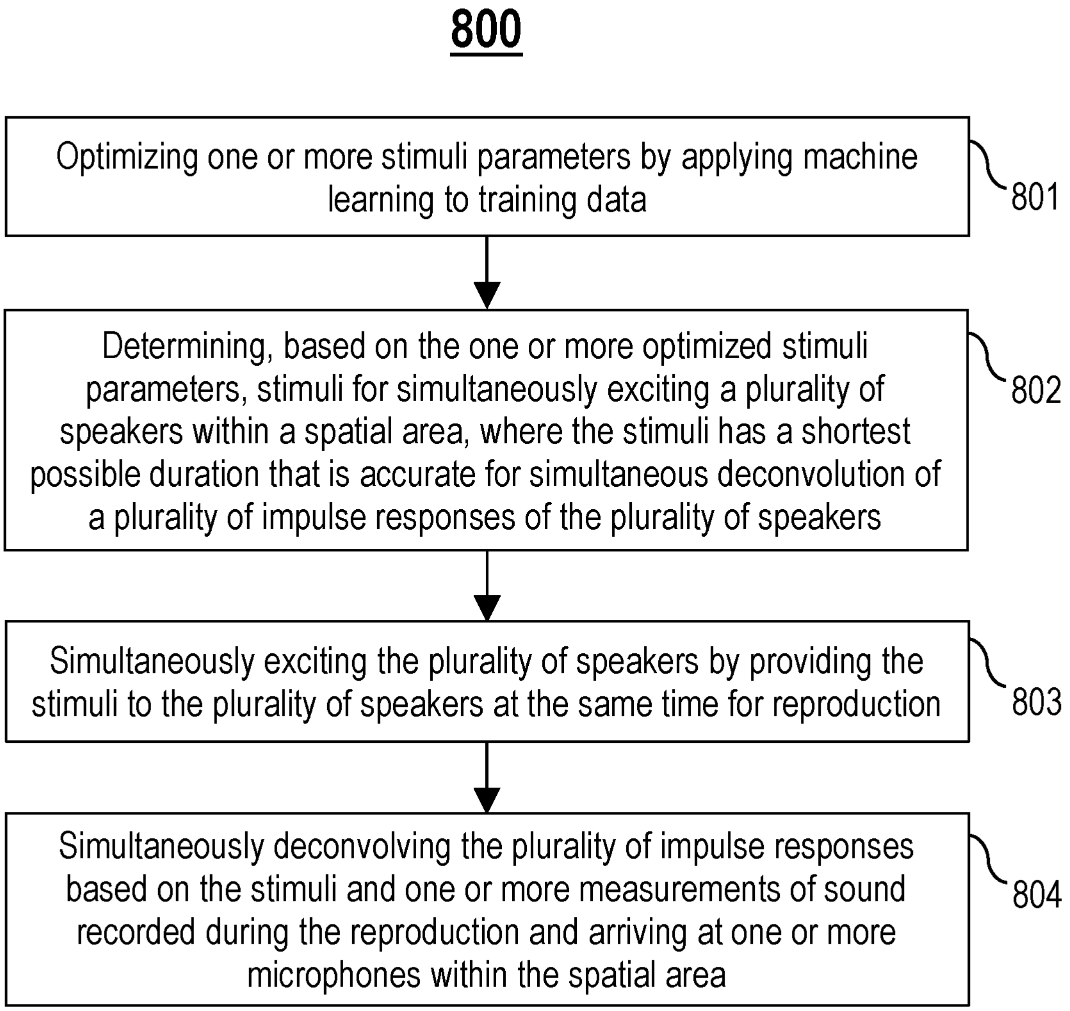
FIG. 11 is a flowchart of an example process for loudspeaker-room equalization with Bayesian optimization for simultaneous deconvolution of loudspeaker-room impulse responses, in one or more embodiments.

FIG. 11 is a flowchart of an example process 800 for loudspeaker-room equalization with Bayesian optimization for simultaneous deconvolution of loudspeaker-room impulse responses, in one or more embodiments. Process block 801 includes optimizing one or more stimuli parameters by applying machine learning to training data. Process block 802 includes determining, based on the one or more optimized stimuli parameters, stimuli for simultaneously exciting a plurality of speakers within a spatial area, where the stimuli has a shortest possible duration that is accurate for simultaneous deconvolution of a plurality of impulse responses of the plurality of speakers. Process block 803 includes simultaneously exciting the plurality of speakers by providing the stimuli to the plurality of speakers at the same time for reproduction. Process block 804 includes simultaneously deconvolving the plurality of impulse responses based on the stimuli and one or more measurements of sound recorded during the reproduction and arriving at one or more microphones within the spatial area.

In one embodiment, process blocks 801-804 may be performed by one or more components of the loudspeaker-room equalization system 130 or 200.

Figure 12:
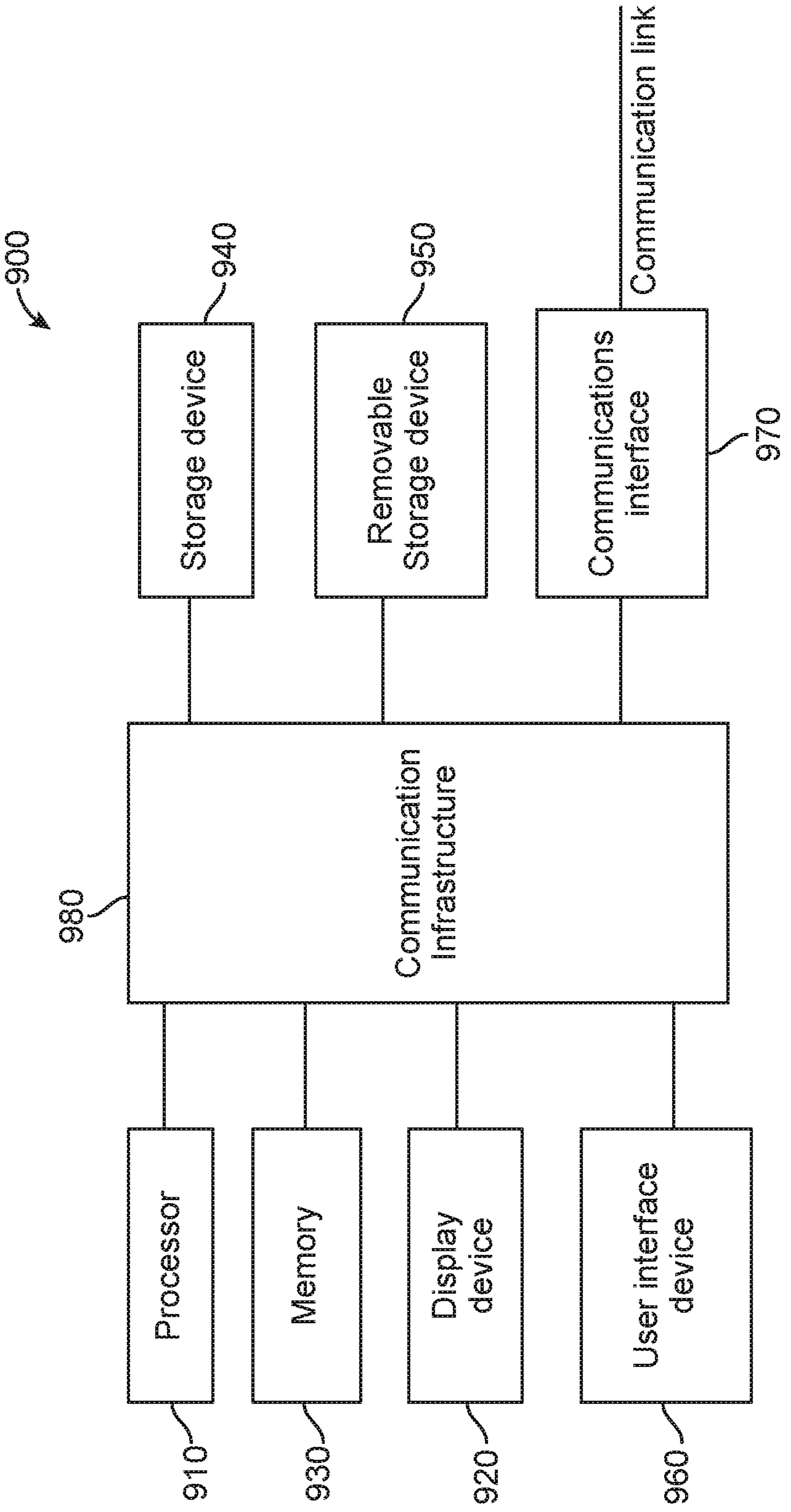
FIG. 12 is a high-level block diagram showing an information processing system comprising a computer system useful for implementing the disclosed embodiments.

FIG. 12 is a high-level block diagram showing an information processing system comprising a computer system 900 useful for implementing the disclosed embodiments. The systems 130 and 200 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 11) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

optimizing one or more stimuli parameters by applying machine learning to training data;

determining, based on the one or more optimized stimuli parameters, stimuli for simultaneously exciting a plurality of speakers within a spatial area, wherein the stimuli has a shortest possible duration that is accurate for simultaneous deconvolution of a plurality of impulse responses of the plurality of speakers;

simultaneously exciting the plurality of speakers by providing the stimuli to the plurality of speakers at the same time for reproduction; and simultaneously deconvolving the plurality of impulse responses based on the stimuli and one or more measurements of sound recorded during the reproduction and arriving at one or more microphones within the spatial area.

2. The method of claim 1, wherein the optimizing comprises:

applying to the training data a machine learning algorithm for Bayesian optimization in a frequency domain.

3. The method of claim 1, wherein the optimizing comprises:

applying to the training data a machine learning algorithm for Bayesian optimization in a time domain.

4. The method of claim 3, wherein the machine learning algorithm eliminates artifacts from the plurality of impulse responses in the time domain.

5. The method of claim 1, wherein the optimizing comprises:

selecting a random combination of actual impulse responses from the training data;

constructing stimulus signals based on one or more candidate stimuli parameters;

estimating impulse responses based on the stimulus signals; and minimizing a magnitude response error between the actual impulse responses and the estimated impulse responses, wherein the one or more candidate stimuli parameters converge to the one or more optimized stimuli parameters when the magnitude response error is minimized.

6. The method of claim 1, wherein the stimuli is continuous and circular.

7. The method of claim 6, wherein the one or more measurements capture reverberation of an arbitrary duration.

8. A system comprising:

at least one processor; and a non-transitory processor-readable memory device storing instructions that when executed by the at least one processor causes the at least one processor to perform operations including:

optimizing one or more stimuli parameters by applying machine learning to training data;

determining, based on the one or more optimized stimuli parameters, stimuli for simultaneously exciting a plurality of speakers within a spatial area, wherein the stimuli has a shortest possible duration that is accurate for simultaneous deconvolution of a plurality of impulse responses of the plurality of speakers;

simultaneously exciting the plurality of speakers by providing the stimuli to the plurality of speakers at the same time for reproduction; and simultaneously deconvolving the plurality of impulse responses based on the stimuli and one or more measurements of sound recorded during the reproduction and arriving at one or more microphones within the spatial area.

9. The system of claim 8, wherein the optimizing comprises:

applying to the training data a machine learning algorithm for Bayesian optimization in a frequency domain.

10. The system of claim 8, wherein the optimizing comprises:

applying to the training data a machine learning algorithm for Bayesian optimization in a time domain.

11. The system of claim 10, wherein the machine learning algorithm eliminates artifacts from the plurality of impulse responses in the time domain.

12. The system of claim 8, wherein the optimizing comprises:

selecting a random combination of actual impulse responses from the training data;

constructing stimulus signals based on one or more candidate stimuli parameters;

estimating impulse responses based on the stimulus signals; and minimizing a magnitude response error between the actual impulse responses and the estimated impulse responses, wherein the one or more candidate stimuli parameters converge to the one or more optimized stimuli parameters when the magnitude response error is minimized.

13. The system of claim 8, wherein the stimuli is continuous and circular.

14. The system of claim 13, wherein the one or more measurements capture reverberation of an arbitrary duration.

15. A non-transitory processor-readable medium that includes a program that when executed by a processor performs a method comprising:

optimizing one or more stimuli parameters by applying machine learning to training data;

determining, based on the one or more optimized stimuli parameters, stimuli for simultaneously exciting a plurality of speakers within a spatial area, wherein the stimuli has a shortest possible duration that is accurate for simultaneous deconvolution of a plurality of impulse responses of the plurality of speakers;

simultaneously exciting the plurality of speakers by providing the stimuli to the plurality of speakers at the same time for reproduction; and simultaneously deconvolving the plurality of impulse responses based on the stimuli and one or more measurements of sound recorded during the reproduction and arriving at one or more microphones within the spatial area.

16. The non-transitory processor-readable medium of claim 15, wherein the optimizing comprises:

applying to the training data a machine learning algorithm for Bayesian optimization in a frequency domain.

17. The non-transitory processor-readable medium of claim 15, wherein the optimizing comprises:

applying to the training data a machine learning algorithm for Bayesian optimization in a time domain.

18. The non-transitory processor-readable medium of claim 17, wherein the machine learning algorithm eliminates artifacts from the plurality of impulse responses in the time domain.

19. The non-transitory processor-readable medium of claim 15, wherein the optimizing comprises:

selecting a random combination of actual impulse responses from the training data;

constructing stimulus signals based on one or more candidate stimuli parameters;

estimating impulse responses based on the stimulus signals; and minimizing a magnitude response error between the actual impulse responses and the estimated impulse responses, wherein the one or more candidate stimuli parameters converge to the one or more optimized stimuli parameters when the magnitude response error is minimized.

20. The non-transitory processor-readable medium of claim 15, wherein the stimuli is continuous and circular.

* * * * *